(12) United States Patent
Arai et al.

(10) Patent No.: US 12,294,068 B2
(45) Date of Patent: May 6, 2025

(54) BATTERY TEMPERATURE REGULATING APPARATUS

(71) Applicant: SUBARU CORPORATION, Tokyo (JP)

(72) Inventors: Yoshitaka Arai, Tokyo (JP); Kazuki Furuta, Tokyo (JP); Toshiaki Naruke, Tokyo (JP); Norio Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 464 days.

(21) Appl. No.: 17/824,564

(22) Filed: May 25, 2022

(65) Prior Publication Data

US 2022/0393263 A1    Dec. 8, 2022

(30) Foreign Application Priority Data

Jun. 8, 2021    (JP) .................................. 2021-095771

(51) Int. Cl.
*H01M 10/635*    (2014.01)
*H01M 10/48*    (2006.01)
(Continued)

(52) U.S. Cl.
CPC ....... *H01M 10/635* (2015.04); *H01M 10/486* (2013.01); *H01M 10/613* (2015.04);
(Continued)

(58) Field of Classification Search
CPC ............. H01M 10/635; H01M 10/486; H01M 10/613; H01M 10/625; H01M 10/6551;
(Continued)

(56) References Cited

U.S. PATENT DOCUMENTS 8,679,659 B2 * 3/2014 Claypole ........... H01M 10/6569
429/50
10,000,138 B2 * 6/2018 Tanaka ................ H01M 10/625
(Continued)

FOREIGN PATENT DOCUMENTS

CN    109301396 A  *  2/2019  .......... H01M 10/615
CN    114243129 A  *  3/2022  .......... H01M 10/425
(Continued)

OTHER PUBLICATIONS

Office Action dated Mar. 5, 2025 issued in Japanese Patent Application No. 2021-095771 (including machine translation).

*Primary Examiner* — Kaity V Chandler
(74) *Attorney, Agent, or Firm* — Troutman Pepper Locke LLP

(57) ABSTRACT

A battery temperature regulating apparatus includes an onboard battery, a temperature regulating plate, a heat exchanger including a container and a first internal passage, first to third passages, a radiator, a valve, a temperature sensor, and a control device including a processor and a memory. The processor is configured to execute, in cooperation with a program included in the memory, a process including determining whether a temperature of the onboard battery is higher than an upper threshold of a proper temperature range, determining whether a heat source is in the container at least based on the temperature of a first heat medium detected by the temperature sensor, and if the temperature of the onboard battery is higher than the upper threshold and that the heat source is in the container, controlling the valve in such a way as to allow the first heat medium to flow through the heat exchanger.

7 Claims, 15 Drawing Sheets

(51) Int. Cl.
*H01M 10/613* (2014.01)
*H01M 10/625* (2014.01)
*H01M 10/6551* (2014.01)
*H01M 10/6554* (2014.01)
*H01M 10/6556* (2014.01)
*H01M 10/6566* (2014.01)
*H01M 10/6569* (2014.01)
*H01M 10/663* (2014.01)

(52) U.S. Cl.
CPC ..... *H01M 10/625* (2015.04); *H01M 10/6551* (2015.04); *H01M 10/6554* (2015.04); *H01M 10/6556* (2015.04); *H01M 10/6566* (2015.04); *H01M 10/6569* (2015.04); *H01M 10/663* (2015.04)

(58) Field of Classification Search
CPC ......... H01M 10/6554; H01M 10/6556; H01M 10/6566; H01M 10/6569; H01M 10/663; H01M 2220/20; H01M 10/48; H01M 10/615; H01M 10/617; H01M 10/63; H01M 10/633; H01M 10/647; H01M 10/6563; H01M 10/6568; Y02E 60/10
See application file for complete search history.

(56) References Cited

U.S. PATENT DOCUMENTS

| | | | |
|---|---|---|---|
| 2010/0212339 A1* | 8/2010 | Kelty | B60L 58/26 62/157 |
| 2012/0003516 A1* | 1/2012 | Eisenhour | H01M 10/625 429/62 |
| 2014/0287281 A1* | 9/2014 | Murata | H01M 50/204 429/50 |
| 2018/0145380 A1* | 5/2018 | Zhao | H01M 50/211 |
| 2020/0231023 A1 | 7/2020 | Sathasivam et al. | |
| 2020/0259227 A1* | 8/2020 | Salonen | H01M 10/6553 |
| 2021/0016628 A1* | 1/2021 | Kozasa | H01M 10/613 |
| 2021/0108841 A1 | 4/2021 | Sugimura et al. | |
| 2022/0118817 A1* | 4/2022 | Almkvist | F28F 17/00 |

FOREIGN PATENT DOCUMENTS

| | | | | |
|---|---|---|---|---|
| CN | 114335595 A | * | 4/2022 | ............. Y02E 60/10 |
| CN | 216488238 U | * | 5/2022 | ............. Y02E 60/10 |
| JP | 2006-073404 A | | 3/2006 | |
| JP | 2006-296193 A | | 10/2006 | |
| JP | 2013051099 A | * | 3/2013 | ......... H01M 10/625 |
| JP | 2019-209938 A | | 12/2019 | |

* cited by examiner

BATTERY TEMPERATURE REGULATING APPARATUS

CROSS-REFERENCE TO RELATED APPLICATION

The present application claims priority from Japanese Patent Application No. 2021-095771 filed on Jun. 8, 2021, the entire contents of which are hereby incorporated by reference.

BACKGROUND

The disclosure relates to a battery temperature regulating apparatus capable of regulating the temperature of an onboard battery.

For example, Japanese Unexamined Patent Application Publication (JP-A) No. 2006-296193 discloses a technique that regulates the temperature of an onboard battery. With this technique, a coolant is circulated around the onboard battery and the coolant is cooled by a refrigerant in an air conditioner. This suppresses an excessive rise in the temperature of the onboard battery.

SUMMARY

An aspect of the disclosure provides a battery temperature regulating apparatus to be applied to a vehicle. The battery temperature regulating apparatus includes an onboard battery, a temperature regulating plate, a heat exchanger, a first passage, a second passage, a third passage, a radiator, a valve, a first temperature sensor, and a control device. The temperature regulating plate is configured to allow heat exchange between the onboard battery and a first heat medium flowing into the temperature regulating plate. The first passage is configured to guide the first heat medium flowing out of the temperature regulating plate to the heat exchanger. The second passage is configured to guide the first heat medium flowing out of the heat exchanger to the temperature regulating plate. The third passage is configured to branch off the first passage at a branch point and join the second passage. The radiator is disposed in the of the third passage. The valve is capable of opening and closing the first passage on a side of closer branch point adjacent to the heat exchanger and capable of opening and closing the third passage on another side of the branch point. The first temperature sensor is configured to detect a temperature of the first heat medium flowing through the first passage. The heat exchanger includes a container and a first internal passage. The container is configured to accommodate a heat source that does not use a power supply for a vehicle. The first internal passage is disposed around the container in such a way as to allow heat exchange. The first internal passage is configured to allow the first passage to communicate with the second passage. The control device includes at least one memory and at least one processor coupled to the at least one memory. The processor is configured to execute a process in cooperation with a program included in the at least one memory. The process includes determining whether a temperature of the onboard battery is higher than an upper threshold of a proper temperature range. The process includes determining whether the heat source is mounted in the container at least on the basis of the temperature of the first heat medium detected by the first temperature sensor. The process includes in a case where the temperature of the onboard battery is determined to be higher than the upper threshold and the heat source is determined to be mounted in the container, controlling the valve in such a way as to allow the first heat medium to flow through the heat exchanger.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

To regulate the temperature of the onboard battery by using the refrigerant in the air conditioner, the technique disclosed in JP-A No. 2006-296193 uses power, for example, for driving a compressor. This means that by regulating the temperature of the onboard battery with the technique disclosed in JP-A No. 2006-296193, the amount of power consumed by the onboard battery may increase.

Accordingly, it is desirable to provide a battery temperature regulating apparatus that is capable of regulating the temperature of an onboard battery while reducing power consumption of the onboard battery.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
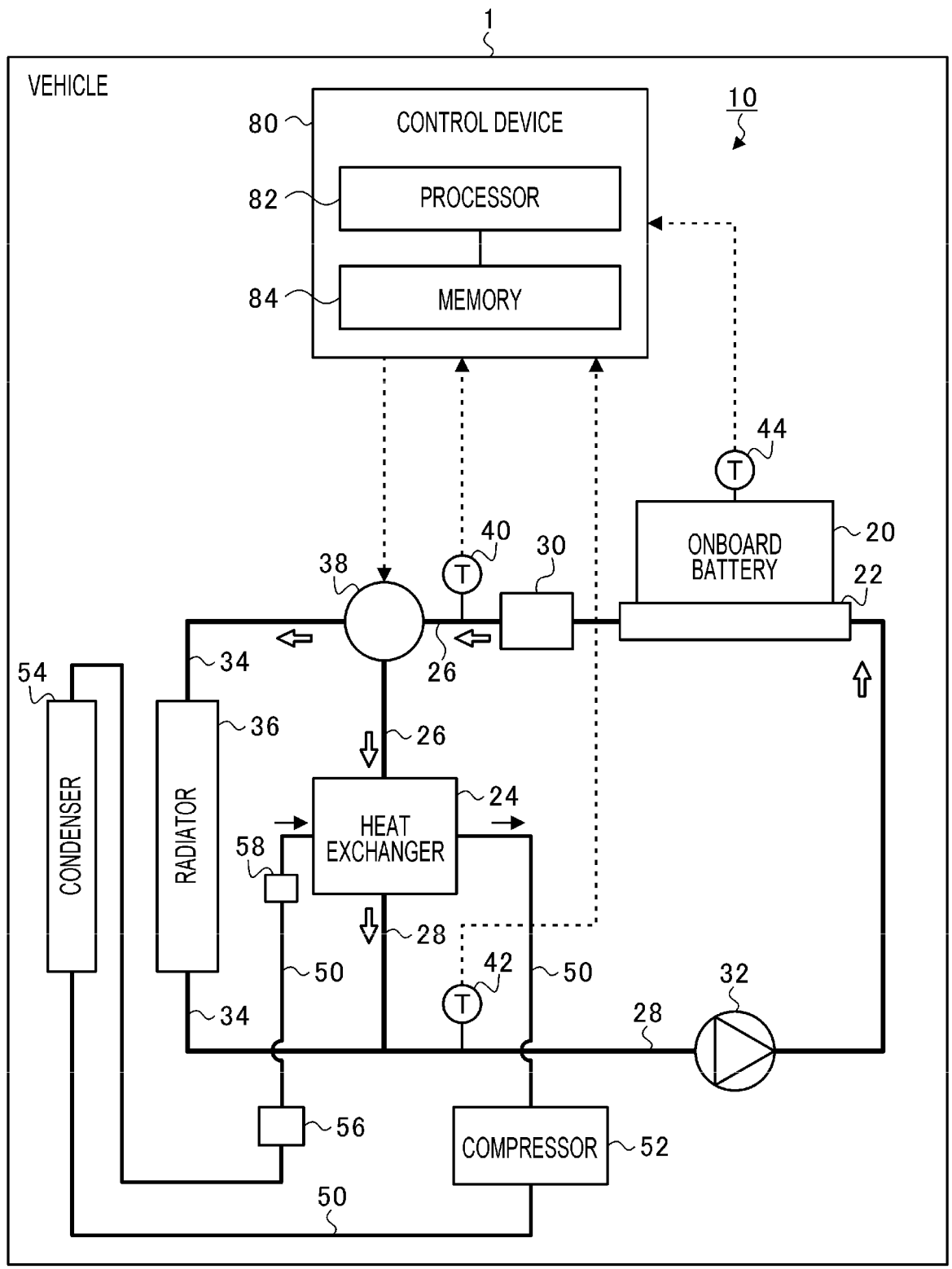
FIG. 1 is a schematic diagram illustrating a configuration of a vehicle including a battery temperature regulating apparatus according to an embodiment.

FIG. 1 is a schematic diagram illustrating a configuration of a vehicle 1 including a battery temperature regulating apparatus 10 according to a first embodiment. The vehicle 1 is, for example, an electric vehicle or a hybrid electric vehicle.

The vehicle 1 includes an onboard battery 20. The onboard battery 20 is, for example, a secondary battery, such as a lithium-ion battery. The onboard battery 20 supplies power to a motor generator serving as a drive source for the vehicle 1. The motor generator drives wheels of the vehicle 1. The motor generator generates power when the vehicle 1 slows down. The onboard battery 20 is charged with power generated by the motor generator.

The onboard battery 20 has a proper temperature range indicating a predetermined temperature range suitable for charge and discharge. If the temperature of the onboard battery 20 is higher than an upper threshold of the proper temperature range, the onboard battery 20 may deteriorate quickly. If the temperature of the onboard battery 20 is lower than a lower threshold of the proper temperature range, the onboard battery 20 may not be able to output desired power.

Accordingly, the battery temperature regulating apparatus 10 is configured to regulate the temperature of the onboard battery 20 in such a way that the temperature of the onboard battery 20 falls within the proper temperature range. Hereinafter, the temperature of the onboard battery 20 may be referred to as a battery temperature.

The battery temperature regulating apparatus 10 includes a temperature regulating plate 22. The temperature regulating plate 22 is, for example, a plate-like member in contact with the onboard battery 20. The temperature regulating plate 22 includes an internal pipe therein. The internal pipe allows a first heat medium to flow therethrough. The first heat medium is, for example, water, but may be any other heat medium.

To make the surface area of the internal pipe greater, for example, the internal pipe has a bellows shape in the temperature regulating plate 22. The shape of the internal pipe is not limited to a bellows shape. For example, the internal pipe may be divided into multiple branches in the temperature regulating plate 22, or may have any configuration that provides a greater surface area. The temperature regulating plate 22 allows heat exchange between the onboard battery 20 and the first heat medium flowing into the internal pipe in the temperature regulating plate 22.

The battery temperature regulating apparatus 10 includes a heat exchanger 24. While described in detail below, the heat exchanger 24 is configured to accommodate a heat source that does not use a power supply for the vehicle 1. The heat source may be anything that can be brought in by occupants from outside the vehicle 1.

The heat source is, for example, a container (e.g., plastic bottle) containing a cold liquid or a hot liquid. For example, a plastic bottle containing a cold liquid serves as a cooling energy source, and a plastic bottle containing a hot liquid serves as a heating energy source. An occupant can place a heat source of any temperature in the heat exchanger 24. The heat source is not limited to a plastic bottle and may be, for example, an external heater heated by an external power supply. The external heater serves as a heating energy source. The heat exchanger 24 will be described in detail later on below.

The battery temperature regulating apparatus 10 includes a first passage 26. The first passage 26 is formed by a pipe that allows the first heat medium to flow therethrough. The outlet of the internal pipe in the temperature regulating plate 22 is coupled to the first passage 26. The first passage 26 extending from the temperature regulating plate 22 reaches the heat exchanger 24. The first passage 26 guides the first heat medium flowing out of the temperature regulating plate 22 to the heat exchanger 24.

The battery temperature regulating apparatus 10 includes a second passage 28. The second passage 28 is formed by a pipe that allows the first heat medium to flow therethrough. The second passage 28 extends from the heat exchanger 24 and reaches the inlet of the internal pipe in the temperature regulating plate 22. The second passage 28 guides the first heat medium flowing out of the heat exchanger 24 to the temperature regulating plate 22.

The battery temperature regulating apparatus 10 includes a reservoir tank 30 and a pump 32. The reservoir tank 30 is disposed in the middle of the first passage 26. The reservoir tank 30 serves as a buffer that temporarily stores the first heat medium. The pump 32 is disposed in the middle of the second passage 28. The pump 32 draws in the first heat medium from the heat exchanger 24 and discharges it toward the temperature regulating plate 22. When the pump 32 is driven, the first heat medium circulates, as indicated by open arrows in FIG. 1, through the first passage 26, the heat exchanger 24, the second passage 28, and the temperature regulating plate 22 in this order.

The battery temperature regulating apparatus 10 includes a third passage 34. The third passage 34 branches off the first passage 26 and joins the second passage 28. The branch point at which the third passage 34 branches off the first passage 26 is located in the first passage 26 between the reservoir tank 30 and the heat exchanger 24. The junction at which the third passage 34 joins the second passage 28 is located in the second passage 28 between the heat exchanger 24 and the pump 32. The third passage 34 is formed by a pipe that allows the first heat medium to flow therethrough.

The battery temperature regulating apparatus 10 includes a radiator 36. The radiator 36 is disposed in the middle of the third passage 34. The radiator 36 allows heat exchange between outside air and the first heat medium flowing through the third passage 34 and releases heat from the first heat medium to the outside of the vehicle 1.

The battery temperature regulating apparatus 10 includes a valve 38. The valve 38 is disposed at the branch point where the third passage 34 branches off the first passage 26. The valve 38 is, for example, a three-way valve. The valve 38 is capable of opening and closing the first passage 26 on a side of the branch point adjacent to the heat exchanger 24, in conjunction with opening and closing the third passage 34 on another side of the branch point.

When the valve 38 is opened on the side of the heat exchanger 24 and closed on the side of the third passage 34, the first heat medium flowing from the temperature regulating plate 22 into the valve 38 does not flow out to the third passage 34 and flows out toward the heat exchanger 24. When the valve 38 is closed on the side of the heat exchanger 24 and opened on the side of the third passage 34, the first heat medium flowing from the temperature regulating plate 22 into the valve 38 does not flow out toward the heat exchanger 24 and flows out to the third passage 34.

The valve 38 is capable of opening both on the side of the heat exchanger 24 and on the side of the third passage 34. When the valve 38 is opened both on the side of the heat exchanger 24 and on the side of the third passage 34, the first heat medium flowing from the temperature regulating plate 22 into the valve 38 flows out to both the heat exchanger 24 and the third passage 34.

The valve 38 is not limited to the three-way valve disposed at the branch point where the third passage 34 branches off the first passage 26. For example, the first passage 26 on the side of the branch point adjacent to the heat exchanger 24 may be provided with a first valve, and the third passage 34 on another side of the branch point may be provided with a second valve different from the first valve.

The battery temperature regulating apparatus 10 includes a first temperature sensor 40, a second temperature sensor 42, and a battery temperature sensor 44. The first temperature sensor 40 is disposed in the first passage 26 between the reservoir tank 30 and the branch point at which the third passage 34 branches off the first passage 26. The first temperature sensor 40 is configured to detect the temperature of the first heat medium flowing through the first passage 26. The second temperature sensor 42 is disposed in the second passage 28 between the pump 32 and the junction at which the third passage 34 joins the second passage 28. The second temperature sensor 42 is configured to detect the temperature of the first heat medium flowing through the second passage 28. The battery temperature sensor 44 is configured to detect the battery temperature.

When the valve 38 is open on the side of the heat exchanger 24 and closed on the side of the third passage 34, the first heat medium flows into the heat exchanger 24. In this state, the first temperature sensor 40 detects the temperature of the first heat medium flowing into the heat exchanger 24. The second temperature sensor 42 detects the temperature of the first heat medium flowing out of the heat exchanger 24.

When the valve 38 is open on the side of the third passage 34 and closed on the side of the heat exchanger 24, the first heat medium flows into the radiator 36. In this state, the first temperature sensor 40 detects the temperature of the first heat medium flowing into the radiator 36. The second temperature sensor 42 detects the temperature of the first heat medium flowing out of the radiator 36.

The battery temperature regulating apparatus 10 includes a fourth passage 50, a compressor 52, and a condenser 54. The fourth passage 50 is formed by a pipe that allows a second heat medium, which is different from the first heat medium, to flow therethrough. The second heat medium is, for example, cooling water, but may be any other heat medium.

The fourth passage 50 extends from the heat exchanger 24, passes through the compressor 52 and the condenser 54, and returns to the heat exchanger 24. As indicated by solid arrows in FIG. 1, the fourth passage 50 allows the second heat medium to circulate through the heat exchanger 24, the compressor 52, and the condenser 54.

The compressor 52 compresses the second heat medium in a gas phase flowing therein from the heat exchanger 24 and discharges the compressed second heat medium to the condenser 54. The condenser 54 allows heat exchange between outside air and the second heat medium compressed by the compressor 52 and releases heat from the second heat medium to the outside of the vehicle 1. The second heat medium, which is cooled under high pressure in the condenser 54, changes its phase from gas to liquid.

The battery temperature regulating apparatus 10 includes a receiver 56 and an expansion valve 58. The receiver 56 is disposed in the fourth passage 50 between the outlet side of the condenser 54 and the heat exchanger 24. The receiver 56 temporarily stores the second heat medium in the liquid phase. The expansion valve 58 is disposed in the fourth passage 50 between the receiver 56 and the heat exchanger 24. The expansion valve 58 sprays, toward the heat exchanger 24, the second heat medium in the liquid phase flowing therein from the receiver 56. The second heat medium, which is expanded by spraying, abruptly reduces its pressure and turns to the gas phase. The second heat medium reduces its temperature by vaporization. While described in detail below, the heat exchanger 24 is configured to allow heat exchange between the second heat medium lowered in temperature by the expansion valve 58 and the first heat medium flowing through the first passage 26.

Figure 2:
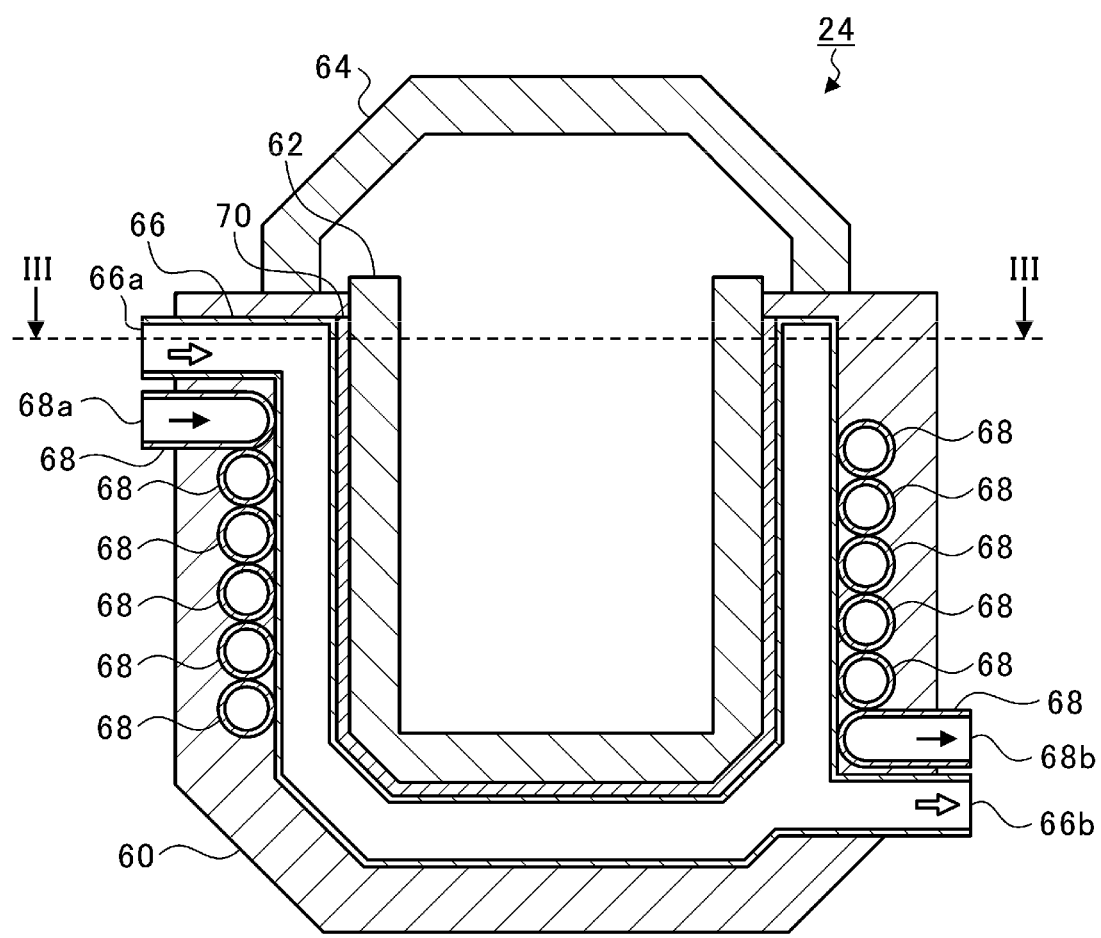
FIG. 2 is a vertical cross-sectional view illustrating a configuration of a heat exchanger according to first embodiment.
Figure 3:
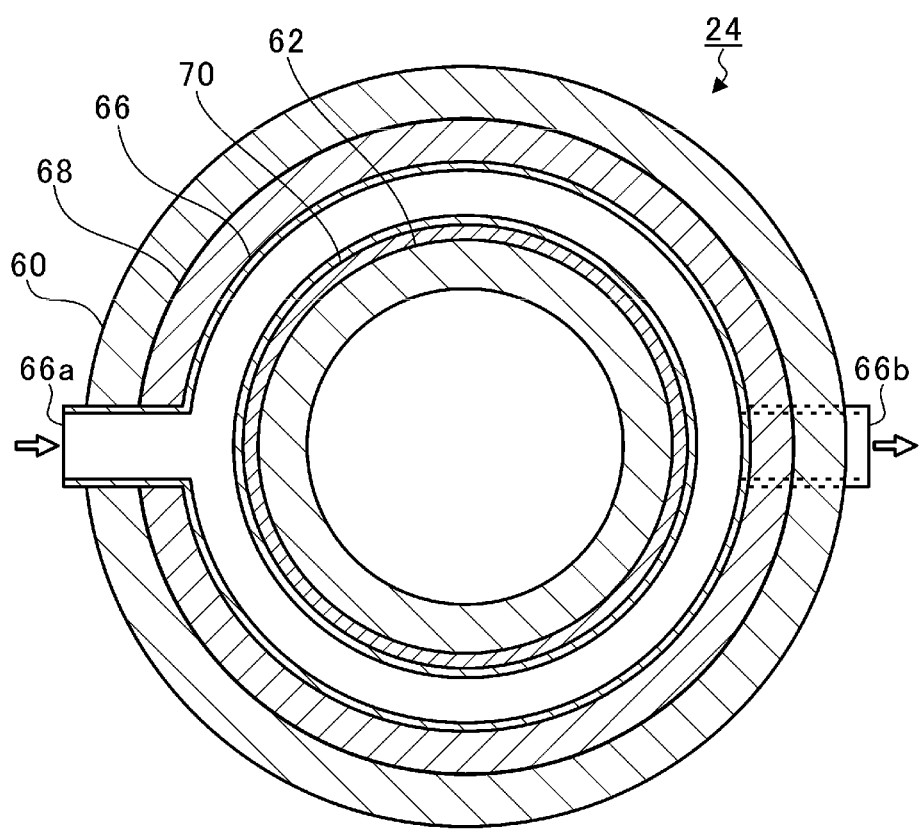
FIG. 3 is a horizontal cross-sectional view taken along line III-III in FIG. 2.

FIG. 2 is a vertical cross-sectional view illustrating a configuration of the heat exchanger 24 according to the first embodiment. FIG. 3 is a horizontal cross-sectional view taken along line III-III in FIG. 2.

The heat exchanger 24 includes a main body 60, a container 62, and a cover 64. The main body 60 is a block member with a columnar recess. The recess in the main body 60 is formed downward from the upper side of the main body 60. The container 62 has a cylindrical shape. The container 62 is closed at the lower end and open at the upper end. The container 62 is mounted in the recess of the main body 60. The container 62 is made of a heat transfer material with a relatively high thermal conductivity. The container 62 is made of, for example, silicon, but may be made of any heat transfer material. The container 62 has an internal space that can accommodate a heat source that does not use a power supply for the vehicle 1. The cover 64 is openably and closably coupled to the upper side of the main body 60 in such a way as to cover the opening of the container 62. The cover 64 is made of, for example, a heat insulating material.

The heat exchanger 24 is disposed in a vehicle compartment of the vehicle 1. For example, the heat exchanger 24 is disposed in a drink holder or a console box. The location of the heat exchanger 24 is not limited to this, and the heat exchanger 24 may be disposed in any place in the vehicle compartment of the vehicle 1. Since the heat exchanger 24 is disposed in the vehicle compartment of the vehicle 1, an occupant can easily place a heat source in the container 62.

The heat exchanger 24 includes a first internal passage 66. The first internal passage 66 is disposed in the main body 60 and around the container 62. For example, the first internal passage 66 is formed in a cylindrical shape extending around the outer periphery of the lateral surface of the container 62 and under the lower end of the container 62.

An inlet 66a of the first internal passage 66 is located in the upper part of the lateral surface of the main body 60 and coupled to the first passage 26. An outlet 66b of the first internal passage 66 is located in the lower part of the lateral surface of the main body 60 and coupled to the second passage 28. That is, the first internal passage 66 allows the first passage 26 to communicate with the second passage 28. The first heat medium flows from the first passage 26, passes through the inlet 66a of the first internal passage 66, and flows into the first internal passage 66 in the heat exchanger 24. After flowing through the first internal passage 66, the first heat medium passes through the outlet 66b of the first internal passage 66 and flows out of the heat exchanger 24 to the second passage 28.

When a heat source is mounted in the container 62, the heat exchanger 24 allows heat exchange between the heat source and the first heat medium flowing through the first internal passage 66.

The heat exchanger 24 includes a second internal passage 68. The second internal passage 68 is disposed in the main body 60 and around the first internal passage 66. The second internal passage 68 is formed, for example, in the shape of a coil wound around the outer periphery of the first internal passage 66. A pipe forming the second internal passage 68 is in contact with the outer periphery of the first internal passage 66.

An inlet 68a of the second internal passage 68 is located in the upper part of the lateral surface of the main body 60 and coupled to the fourth passage 50 adjacent to the expansion valve 58. An outlet 68b of the second internal passage 68 is located in the lower part of the lateral surface of the main body 60 and coupled to the fourth passage 50 adjacent to the compressor 52. That is, the second internal passage 68 allows the fourth passage 50 adjacent to the expansion valve 58 to communicate with the fourth passage 50 adjacent to the compressor 52. The second heat medium flows from the fourth passage 50 adjacent to the expansion valve 58, passes through the inlet 68a of the second internal passage 68, and flows into the second internal passage 68 in the heat exchanger 24. After flowing through the second internal passage 68, the second heat medium passes through the outlet 68b of the second internal passage 68 and flows out of the heat exchanger 24 to the fourth passage 50 adjacent to the compressor 52.

The heat exchanger 24 is configured to allow heat exchange between the second heat medium flowing through the second internal passage 68 and the first heat medium flowing through the first internal passage 66.

The heat exchanger 24 includes a built-in heater 70. The built-in heater 70 is, for example, a film heater having a film shape. The film heater is formed, for example, by a meandering heating wire disposed in a plane. The built-in heater 70 is not limited to a film heater, but may be a heater of any type.

The built-in heater 70 is disposed around the container 62. For example, the built-in heater 70 is disposed between the first internal passage 66 and the container 62. The built-in heater 70 is in contact with both the inner surface of the first internal passage 66 and the outer surface of the container 62.

The built-in heater 70 is electrically coupled to the onboard battery 20. The built-in heater 70 consumes power of the onboard battery 20 and generates heat. The built-in heater 70 is capable of heating the first heat medium flowing through the first internal passage 66.

The built-in heater 70 may be disposed outside the first internal passage 66 and the second internal passage 68 may be disposed inside the first internal passage 66.

Figure 4:
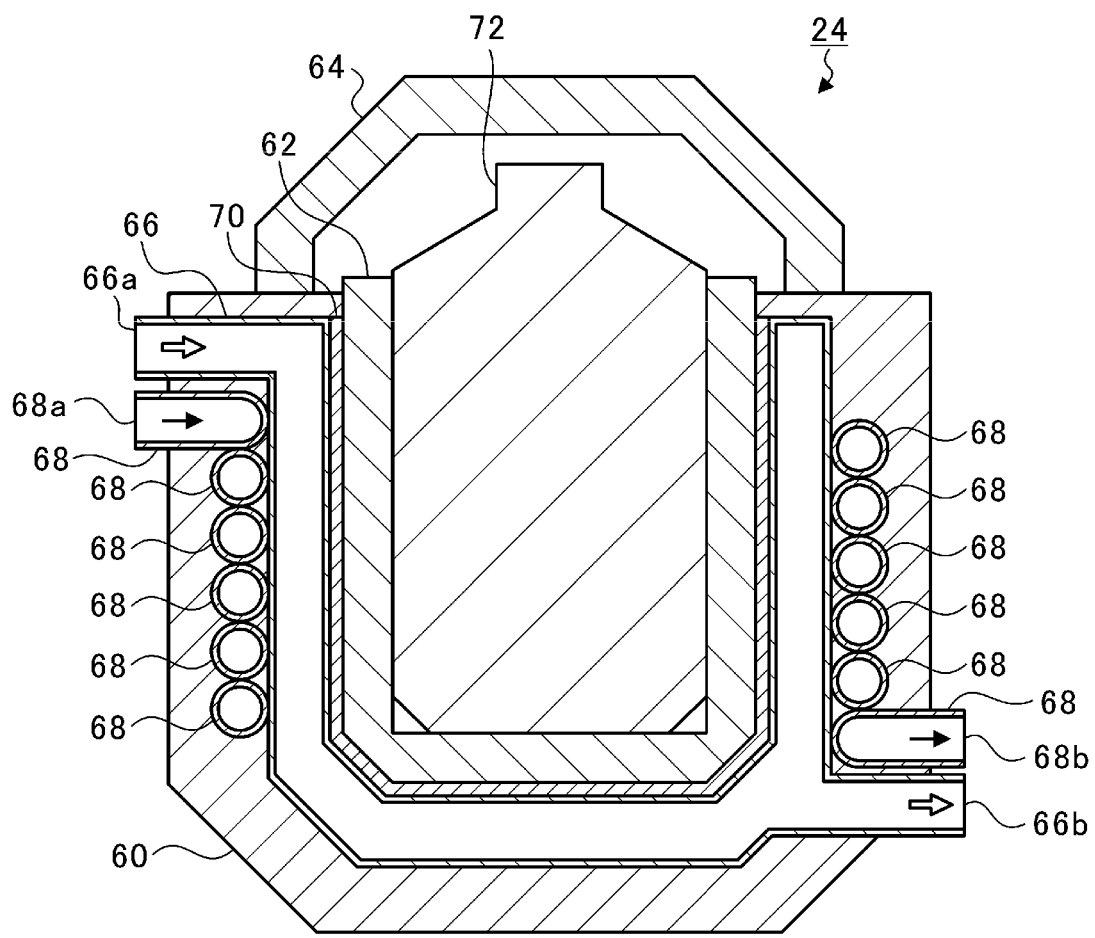
FIG. 4 is a vertical cross-sectional view illustrating a container holding a heat source.

FIG. 4 is a vertical cross-sectional view illustrating the container 62 holding a heat source. The heat source illustrated in FIG. 4 is a plastic bottle 72 containing a cold liquid or a hot liquid. Hereinafter, the plastic bottle 72 containing a cold liquid may be referred to as a cold bottle, and the plastic bottle 72 containing a hot liquid may be referred to as a hot bottle.

An occupant can place a cold bottle in the container 62. When the cold bottle is placed, the cooling energy of the cold bottle is transferred to the container 62. The cooling energy transferred to the container 62 is further transferred through the built-in heater 70 to the first internal passage 66. The first heat medium flowing through the first internal passage 66 is cooled by the cooling energy of the cold bottle. After being cooled, the first heat medium flows through the second passage 28 into the temperature regulating plate 22. The temperature regulating plate 22 lowers the battery temperature with the cooling energy of the first heat medium. That is, if the battery temperature is higher than the upper threshold of the proper temperature range, the battery temperature can be lowered to fall within the proper temperature range by placing the cold bottle in the container 62.

Also, the occupant can place a hot bottle in the container 62. When the hot bottle is placed, the heating energy of the hot bottle is transferred to the container 62. The heating energy transferred to the container 62 is further transferred through the built-in heater 70 to the first internal passage 66. The first heat medium flowing through the first internal passage 66 is heated by the heating energy of the hot bottle. After being heated, the first heat medium flows through the second passage 28 into the temperature regulating plate 22. The temperature regulating plate 22 raises the battery temperature with the heating energy of the first heat medium. That is, if the battery temperature is lower than the lower threshold of the proper temperature range, the battery temperature can be raised to fall within the proper temperature range by placing the hot bottle in the container 62.

The second heat medium cooled by being sprayed by the expansion valve 58 flows into the second internal passage 68. The second heat medium in the second internal passage 68 cools the first heat medium in the first internal passage 66. After being cooled, the first heat medium flows through the second passage 28 into the temperature regulating plate 22. That is, the battery temperature can also be lowered by the cooling energy of the second heat medium.

The built-in heater 70 heats the first heat medium in the first internal passage 66. After being heated, the first heat medium flows through the second passage 28 into the temperature regulating plate 22. That is, the battery temperature can also be raised by the built-in heater 70.

Figure 5:
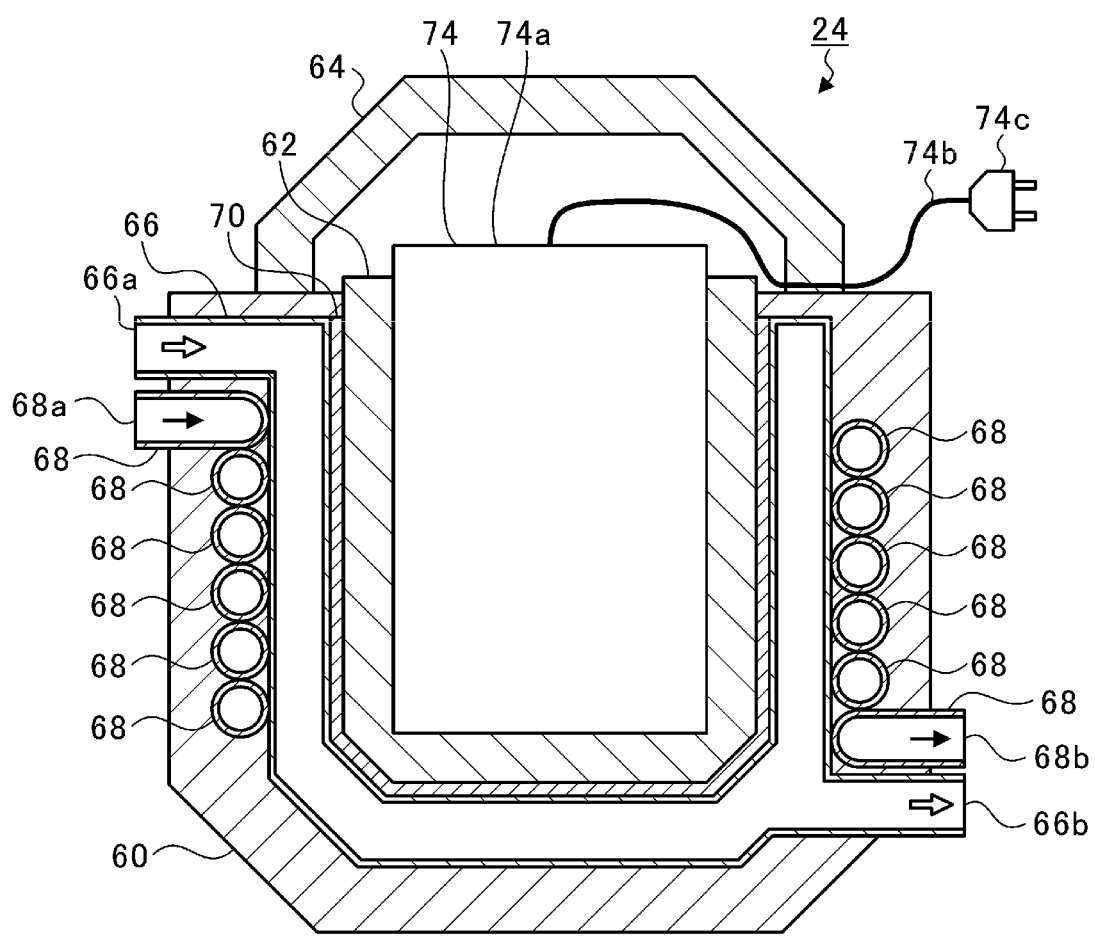
FIG. 5 is a vertical cross-sectional view illustrating the container holding another heat source.

FIG. 5 is a vertical cross-sectional view illustrating the container 62 holding another heat source. The heat source illustrated in FIG. 5 is an external heater 74 heated by an external power supply. The external heater 74 includes a heater body 74a, a cable 74b, and a plug 74c. The heater body 74a has a columnar shape that can be accommodated in the container 62. The cable 74b extends from the upper end of the heater body 74a. The plug 74c is at an end of the cable 74b. The plug 74c is coupled to, for example, a receptacle outside the vehicle 1. The heater body 74a generates heat when the plug 74c is coupled to the receptacle.

An occupant can enable the heater body 74a of the external heater 74 to generate heat by placing the heater body 74a in the container 62. The heater body 74a thus heats the first heat medium in the first internal passage 66, with the container 62 and the built-in heater 70 therebetween. After being heated, the first heat medium flows through the second passage 28 into the temperature regulating plate 22. That is, the battery temperature can also be raised by the external heater 74.

Figure 6:
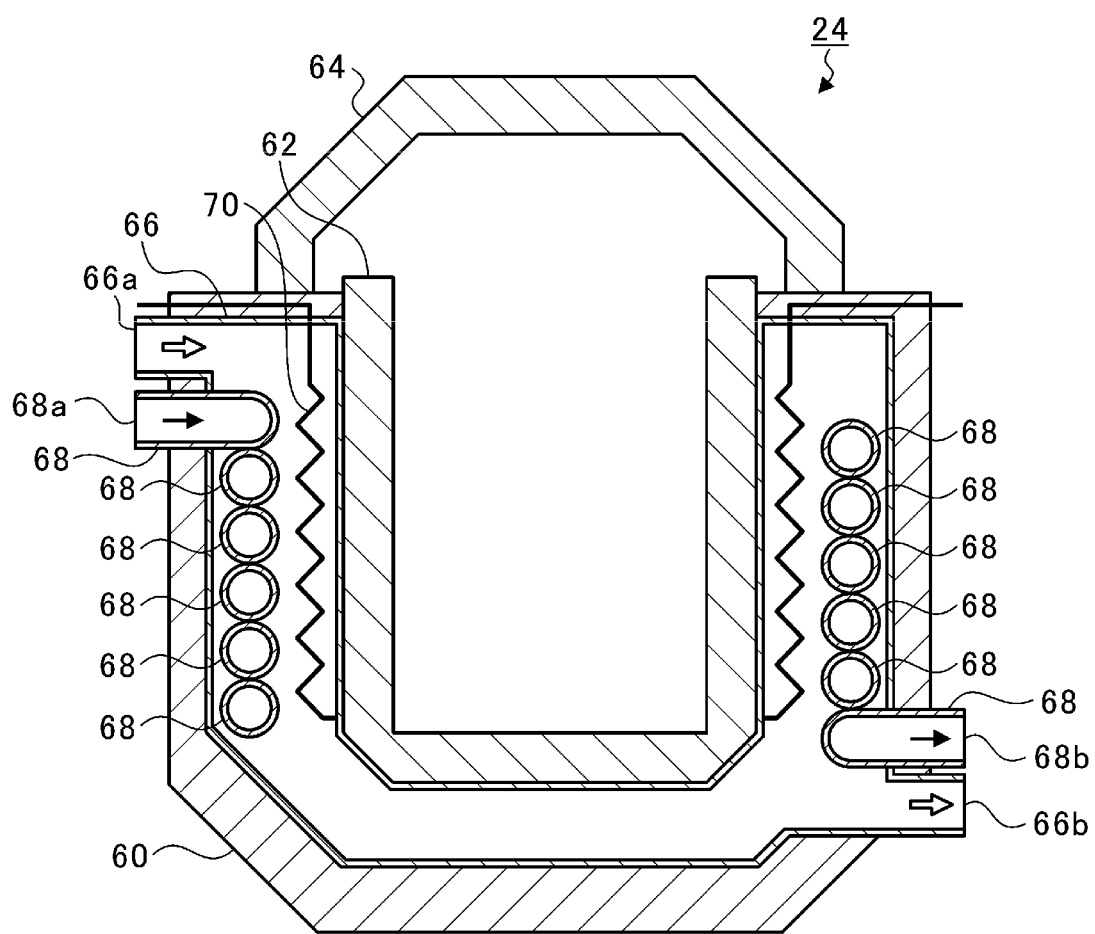
FIG. 6 is a vertical cross-sectional view illustrating a modification of the heat exchanger.

FIG. 6 is a vertical cross-sectional view illustrating a modification of the heat exchanger 24. In the heat exchanger 24 illustrated in FIG. 6, the second internal passage 68 is disposed in the first internal passage 66. This modification also allows heat exchange between the second heat medium in the second internal passage 68 and the first heat medium in the first internal passage 66 and cools the first heat medium. In the heat exchanger 24 illustrated in FIG. 6, the built-in heater 70 is disposed in the first internal passage 66. Accordingly, this modification allows the built-in heater 70 to directly heat the first heat medium in the first internal passage 66.

The second internal passage 68 may be disposed in the first internal passage 66 and the built-in heater 70 may be disposed around the first internal passage 66. The second internal passage 68 may be disposed around the first internal passage 66 and the built-in heater 70 may be disposed in the first internal passage 66.

Figure 7:
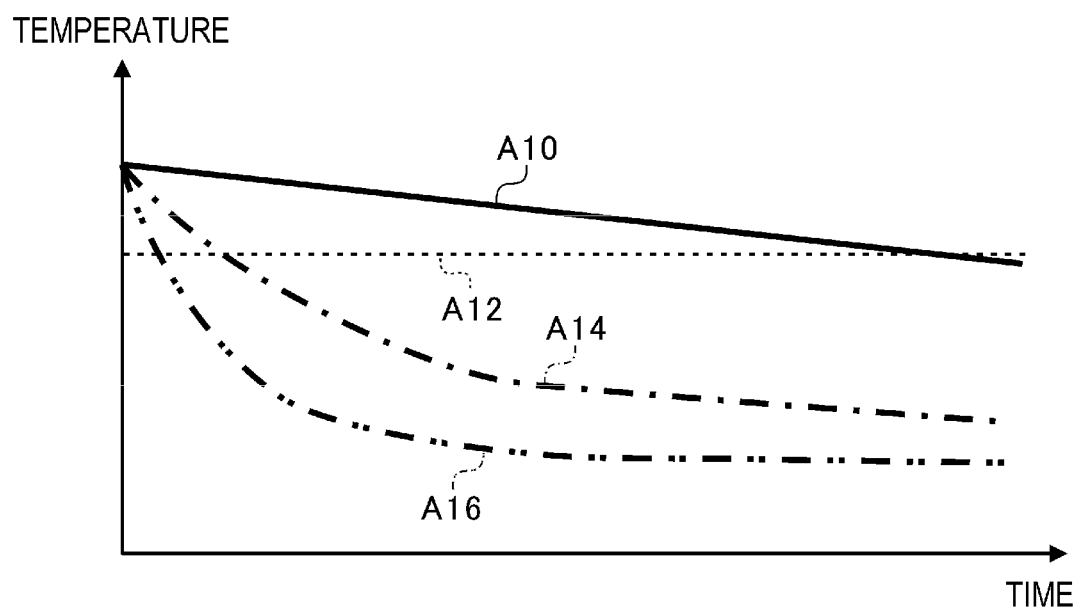
FIG. 7 is a diagram illustrating an example of how temperatures change with time when the battery temperature is lowered.

FIG. 7 is a diagram illustrating an example of how temperatures change with time when the battery temperature is lowered. A solid line A10 in FIG. 7 indicates a battery temperature detected by the battery temperature sensor 44. A dotted line A12 in FIG. 7 indicates an upper threshold of a proper temperature range of the battery temperature. A dot-and-dash line A14 in FIG. 7 indicates the temperature of the first heat medium detected by the first temperature sensor 40. A two-dot chain line A16 in FIG. 7 indicates the temperature of the first heat medium detected by the second temperature sensor 42.

When the battery temperature is lowered, the first heat medium cooled in the heat exchanger 24 or the radiator 36 flows into the temperature regulating plate 22. Therefore, as indicated by the two-dot chain line A16, the temperature of the first heat medium detected by the second temperature sensor 42 decreases at an early stage. Since the temperature regulating plate 22 allows heat exchange between the onboard battery 20 and the first heat medium, the temperature of the first heat medium flowing out of the temperature regulating plate 22 is higher than the temperature of the first heat medium flowing into the temperature regulating plate 22. Therefore, as indicated by the dot-and-dash line A14, the temperature of the first heat medium detected by the first temperature sensor 40 decreases more slowly than the temperature of the first heat medium detected by the second temperature sensor 42. When the first heat medium cooled in the heat exchanger 24 or the radiator 36 continuously flows into the temperature regulating plate 22, the battery temperature gradually decreases, as indicated by the solid line A10, more slowly than the temperature of the first heat medium detected by the first temperature sensor 40. The battery temperature can thus be lowered to or below the upper threshold of the proper temperature range.

Figure 8:
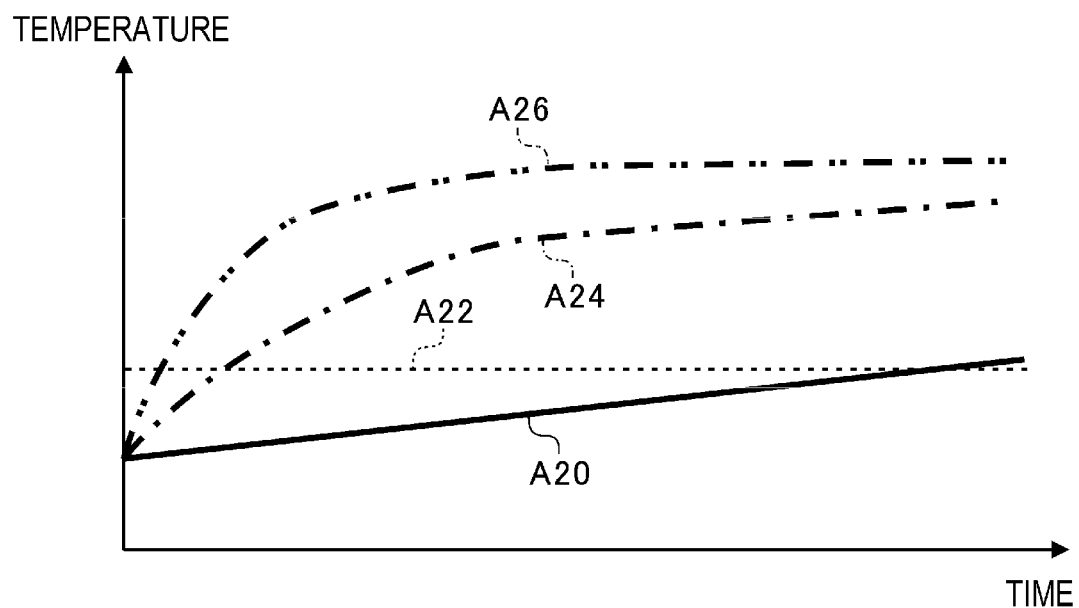
FIG. 8 is a diagram illustrating an example of how temperatures change with time when the battery temperature is raised.

FIG. 8 is a diagram illustrating an example of how temperatures change with time when the battery temperature is raised. A solid line A20 in FIG. 8 indicates a battery temperature detected by the battery temperature sensor 44. A dotted line A22 in FIG. 8 indicates a lower threshold of a proper temperature range of the battery temperature. A dot-and-dash line A24 in FIG. 8 indicates the temperature of the first heat medium detected by the first temperature sensor 40. A two-dot chain line A26 in FIG. 8 indicates the temperature of the first heat medium detected by the second temperature sensor 42.

When the battery temperature is raised, the first heat medium heated in the heat exchanger 24 flows into the temperature regulating plate 22. Therefore, as indicated by the two-dot chain line A26, the temperature of the first heat medium detected by the second temperature sensor 42 increases at an early stage. Since the temperature regulating plate 22 allows heat exchange between the onboard battery 20 and the first heat medium, the temperature of the first heat medium flowing out of the temperature regulating plate 22 is lower than the temperature of the first heat medium flowing into the temperature regulating plate 22. Therefore, as indicated by the dot-and-dash line A24, the temperature of the first heat medium detected by the first temperature sensor 40 increases more slowly than the temperature of the first heat medium detected by the second temperature sensor 42. When the first heat medium heated in the heat exchanger 24 continuously flows into the temperature regulating plate 22, the battery temperature gradually increases, as indicated by the solid line A20, more slowly than the temperature of the first heat medium detected by the first temperature sensor 40. The battery temperature can thus be raised to or above the lower threshold of the proper temperature range.

As illustrated in FIG. 1, the battery temperature regulating apparatus 10 includes a control device 80. The control device 80 includes at least one processor 82 and at least one memory 84 coupled to the processor 82. The memory 84 includes a read-only memory (ROM) that stores programs and a random-access memory (RAM) that serves as a work area. The processor 82 of the control device 80 is configured to control the overall operation of the battery temperature regulating apparatus 10 in cooperation with the programs included in the memory 84.

For example, the control device 80 determines whether the temperature of the onboard battery 20 is higher than the upper threshold of the proper temperature range. The control device 80 determines whether a heat source is mounted in the container 62 at least on the basis of detection made by the first temperature sensor 40. If the control device 80 determines that the temperature of the onboard battery 20 is higher than the upper threshold and that a heat source is mounted in the container 62, the control device 80 controls the valve 38 in such a way as to allow the first heat medium to flow through the heat exchanger 24.

Assume that the control device 80 determines that the temperature of the onboard battery 20 is higher than the upper threshold and that a heat source is mounted in the container 62. In this case, if the outside air temperature is higher than or equal to the battery temperature, the control device 80 controls the valve 38 in such a way as to shut off the flow of the first heat medium into the radiator 36 and allow the first heat medium to flow through the heat exchanger 24.

If the outside air temperature is lower than the battery temperature, the control device 80 determines whether the battery temperature is sufficiently lowered by the radiator 36. If determining that the battery temperature is not sufficiently lowered by the radiator 36, the control device 80 controls the valve 38 in such a way as to allow the first heat medium to flow through both the radiator 36 and the heat exchanger 24. A process performed by the control device 80 will now be described in detail.

Figure 9:
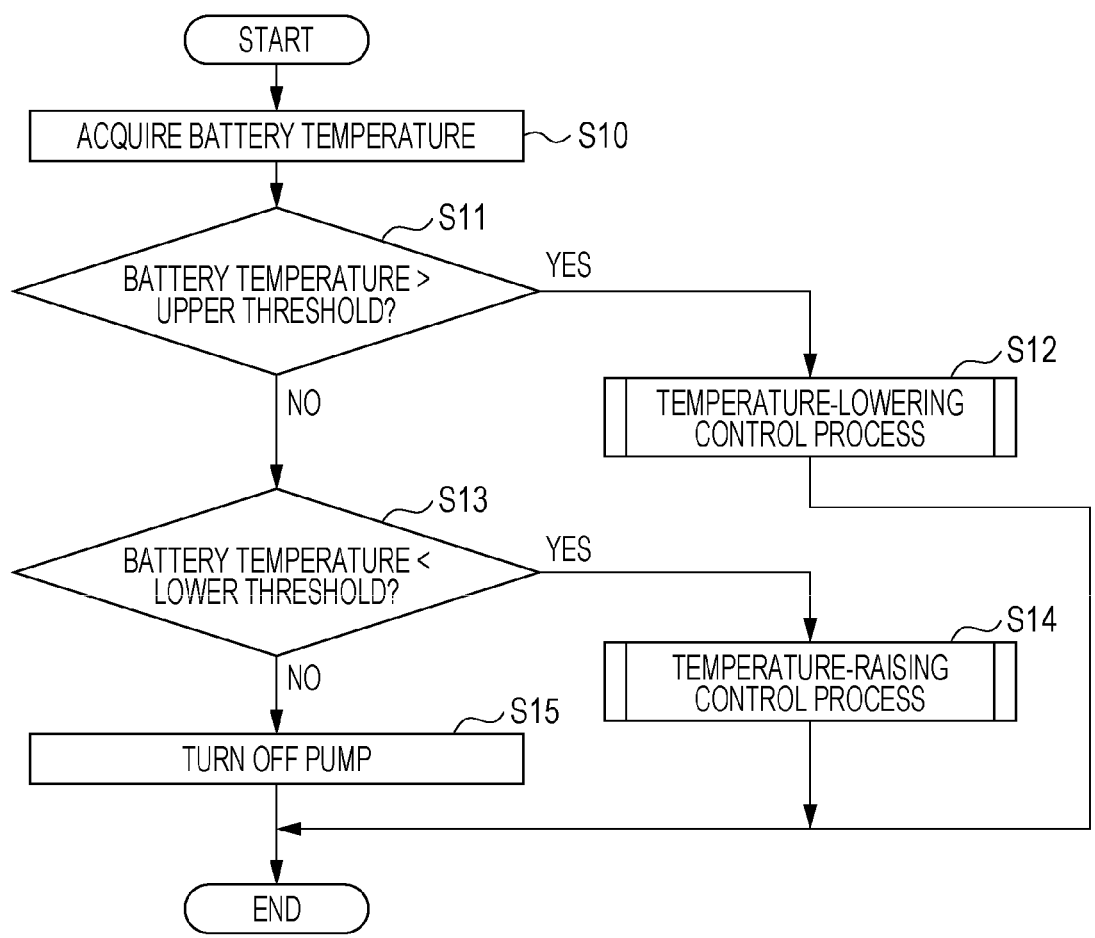
FIG. 9 is a flowchart illustrating a flow of a process performed by a control device.

FIG. 9 is a flowchart illustrating a flow of a process performed by the control device 80. The control device 80 executes the series of operations illustrated in FIG. 9 at predetermined time points of interruption in a predetermined control cycle.

First, the control device 80 acquires a battery temperature from the battery temperature sensor 44 (S10). Next, the control device 80 determines whether the battery temperature is higher than an upper threshold of a proper temperature range (S11). The upper threshold is set to, for example, 30° C., but is not limited to this example and may be set to any value.

If the battery temperature is higher than the upper threshold (YES in S11), the control device 80 executes a temperature-lowering control process (S12) and ends the series of operations. The temperature-lowering control process is a temperature regulating process for lowering the battery temperature. The flow of the temperature-lowering control process will be described in detail later on below.

If the battery temperature is lower than or equal to the upper threshold (NO in S11), the control device 80 determines whether the battery temperature is lower than a lower threshold of the proper temperature range (S13). The lower threshold is set to, for example, 0° C., but is not limited to this example and may be set to any value.

If the battery temperature is lower than the lower threshold (YES in S13), the control device 80 executes a temperature-raising control process (S14) and ends the series of operations. The temperature-raising control process is a temperature regulating process for raising the battery temperature. The flow of the temperature-raising control process will be described in detail later on below.

If the battery temperature is higher than or equal to the lower threshold (NO in S13), the control device 80 turns off the pump 32 (S15) and ends the series of operations.

Figure 10:
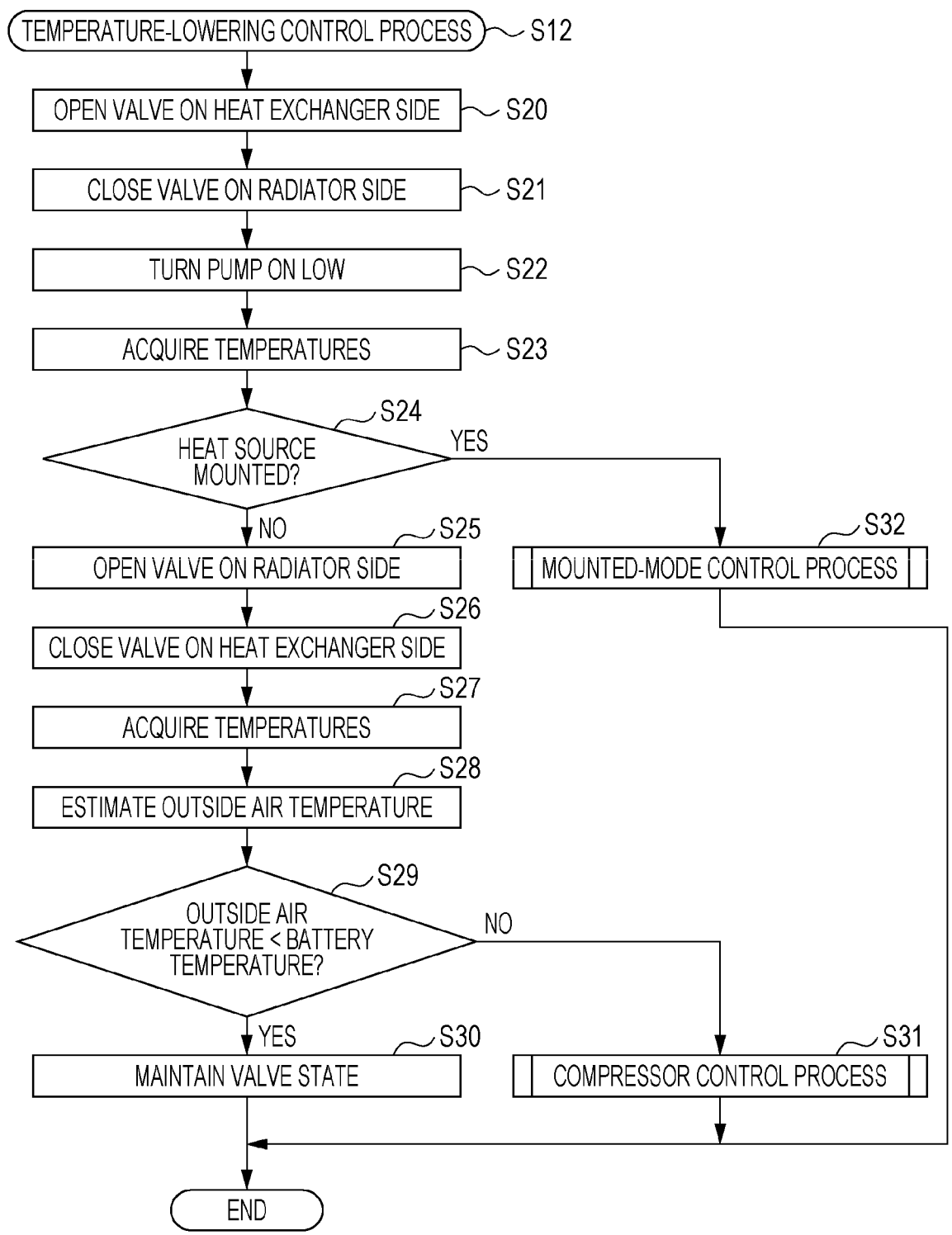
FIG. 10 is a flowchart illustrating a flow of a temperature-lowering control process.

FIG. 10 is a flowchart illustrating a flow of the temperature-lowering control process (S12). In the temperature-lowering control process, a heat source serving as a cooling energy source may be placed in the heat exchanger 24. In the temperature-lowering control process, an alert may be given to prevent a heat source serving as a heating energy source from being placed in the heat exchanger 24.

When the temperature-lowering control process starts, the control device 80 opens the valve 38 on the side of the heat exchanger 24 (S20) and closes the valve 38 on the side of the radiator 36 (S21). This shuts off the flow of the first heat medium into the radiator 36 and allows the first heat medium to flow into the heat exchanger 24. Next, the control device 80 turns the pump 32 on low (S22). This allows circulation of the first heat medium. The control device 80 then acquires the temperature of the first heat medium on the inlet side of the heat exchanger 24 from the first temperature sensor 40 and acquires the temperature of the first heat medium on the outlet side of the heat exchanger 24 from the second temperature sensor 42 (S23).

Next, the control device 80 determines whether a heat source is mounted in the container 62 in the heat exchanger 24 at least on the basis of the temperature acquired from the first temperature sensor 40 (S24). For example, the control device 80 subtracts the temperature detected on the inlet side of the heat exchanger 24 by the first temperature sensor 40 from the temperature detected on the outlet side of the heat exchanger 24 by the second temperature sensor 42 to derive a temperature difference of the first heat medium in the heat exchanger 24. If the absolute value of the derived temperature difference is greater than or equal to a predetermined value, the control device 80 determines that a heat source is mounted. The control device 80 may derive the amount of temporal change in temperature detected on the inlet side of the heat exchanger 24 by the first temperature sensor 40. In this case, if the derived amount of temporal change in temperature is greater than or equal to a predetermined value, the control device 80 determines that a heat source is mounted.

If determining that no heat source is mounted (NO in S24), the control device 80 opens the valve 38 on the side of the radiator 36 (S25) and closes the valve 38 on the side of the heat exchanger 24 (S26). This shuts off the flow of the first heat medium into the heat exchanger 24 and allows the first heat medium to flow into the radiator 36. Next, the control device 80 acquires the temperature of the first heat medium on the inlet side of the radiator 36 from the first temperature sensor 40 and acquires the temperature of the first heat medium on the outlet side of the radiator 36 from the second temperature sensor 42 (S27). Then, the control device 80 estimates the outside air temperature on the basis of the acquired temperatures (S28). For example, the control device 80 refers to a predetermined table that associates temperatures on the outlet side of the radiator 36 with outside air temperatures and converts the temperature detected on the outlet side of the radiator 36 by the second temperature sensor 42 to an outside air temperature.

Next, the control device 80 determines whether the outside air temperature is lower than the battery temperature (S29). This corresponds to the determination as to whether the battery temperature can be lowered with the first heat medium that has exchanged heat with the outside air in the radiator 36.

If the outside air temperature is lower than the battery temperature (YES in S29), the control device 80 maintains the current state of the valve 38 (S30) and ends the temperature-lowering control process. In this case, the valve 38 is kept open on the side of the radiator 36 and kept closed on the side of the heat exchanger 24. That is, the control device 80 lowers the battery temperature with the first heat medium that has exchanged heat in the radiator 36.

If the outside air temperature is higher than or equal to the battery temperature (NO in S29), the control device 80 executes a compressor control process (S31) and ends the temperature-lowering control process. The compressor control process is a temperature regulating process in which the battery temperature is lowered by the first heat medium that has exchanged heat with the second heat medium flowing through the compressor 52. The compressor control process will be described in detail later on below.

If determining in step S24 that a heat source is mounted (YES in S24), the control device 80 executes a mounted-mode control process (S32) and ends the temperature-lowering control process. The mounted-mode control process is a temperature regulating process executed when a heat source is mounted. The mounted-mode control process will be described in detail later on below.

Figure 11:
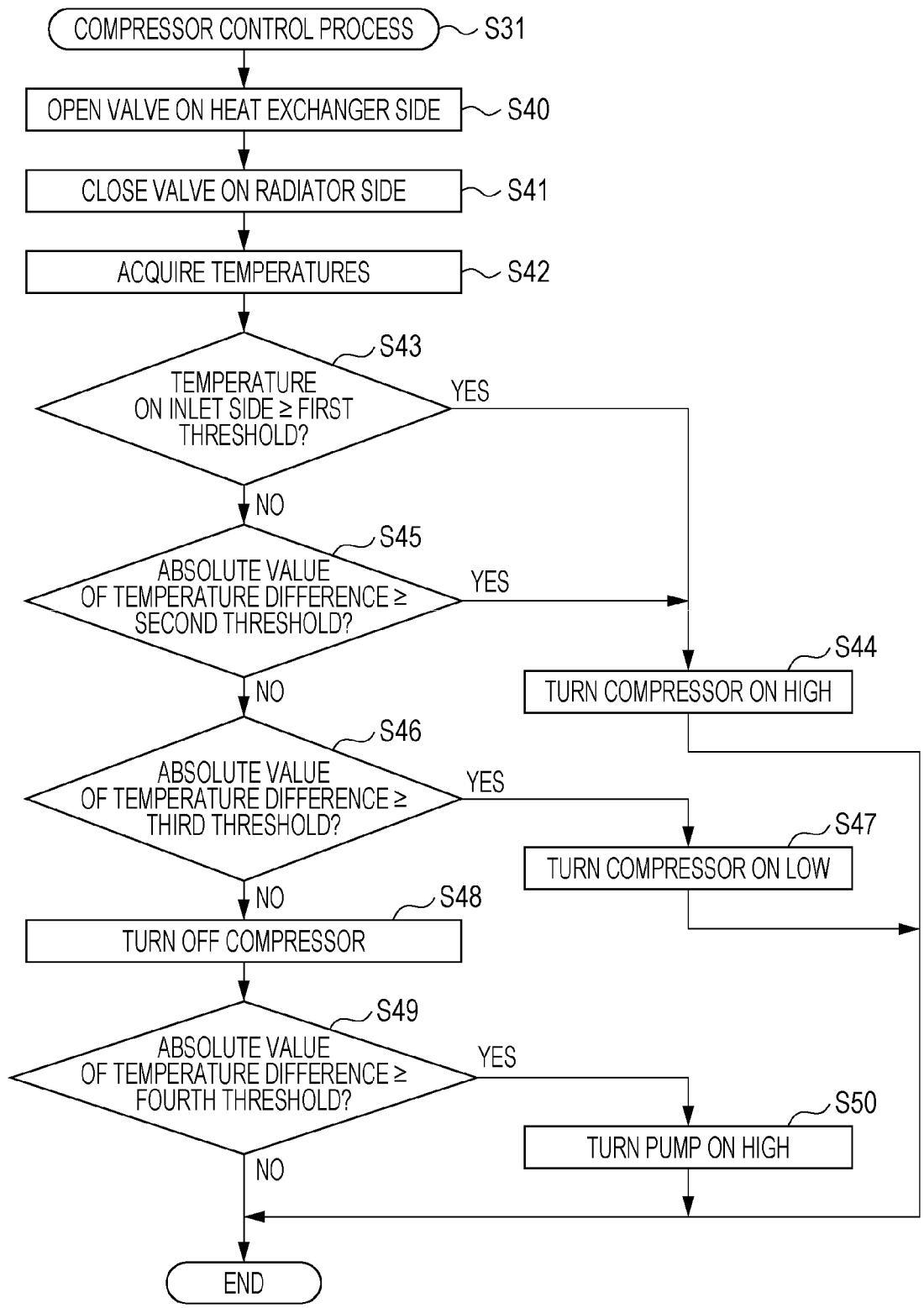
FIG. 11 is a flowchart illustrating a flow of a compressor control process.

FIG. 11 is a flowchart illustrating a flow of the compressor control process (S31). When the compressor control process starts, the control device 80 opens the valve 38 on the side of the heat exchanger 24 (S40) and closes the valve 38 on the side of the radiator 36 (S41). This shuts off the flow of the first heat medium into the radiator 36 and allows the first heat medium to flow into the heat exchanger 24. Next, the control device 80 acquires the temperature of the first heat medium on the inlet side of the heat exchanger 24 from the first temperature sensor 40 and acquires the temperature of the first heat medium on the outlet side of the heat exchanger 24 from the second temperature sensor 42 (S42).

Next, the control device 80 determines whether the temperature of the first heat medium detected on the inlet side of the heat exchanger 24 by the first temperature sensor 40 is higher than or equal to a predetermined first threshold (S43). The predetermined first threshold is set within the proper temperature range of the battery temperature. The predetermined first threshold is set to, for example, 25° C., but is not limited to this example and may be set to any value.

If the temperature on the inlet side is higher than or equal to the first threshold (YES in S43), the battery temperature is not sufficiently lowered. Accordingly, the control device 80 turns the compressor 52 on high (S44) and ends the compressor control process.

If the temperature on the inlet side is lower than the first threshold (NO in S43), the control device 80 determines whether the absolute value of the temperature difference of the first heat medium in the heat exchanger 24 is greater than or equal to a predetermined second threshold (S45). The temperature difference is derived by subtracting the temperature of the first heat medium detected on the inlet side of the heat exchanger 24 by the first temperature sensor 40 from the temperature of the first heat medium detected on the outlet side of the heat exchanger 24 by the second temperature sensor 42. The predetermined second threshold is set to, for example, 10° C., but is not limited to this example and may be set to any value.

If the absolute value of the temperature difference is greater than or equal to the second threshold (YES in S45), the battery temperature is not sufficiently lowered. Accordingly, the control device 80 turns the compressor 52 on high (S44) and ends the compressor control process.

If the absolute value of the temperature difference is less than the second threshold (NO in S45), the control device 80 determines whether the absolute value of the temperature difference is greater than or equal to a predetermined third threshold (S46). The predetermined third threshold is set to be less than the second threshold. The predetermined third threshold is set to, for example, 7° C., but is not limited to this example and may be set to any value.

If the absolute value of the temperature difference is greater than or equal to the third threshold (YES in S46), the control device 80 turns the compressor 52 on low (S47) and ends the compressor control process. When the compressor 52 is on low, the heat exchange between the second heat medium and the first heat medium can be suppressed more than when the compressor 52 is on high.

If the absolute value of the temperature difference is less than the third threshold (NO in S46), the control device 80 turns off the compressor 52 (S48). Next, the control device 80 determines whether the absolute value of the temperature difference is greater than or equal to a predetermined fourth threshold (S49). The predetermined fourth threshold is set to be less than the third threshold. The predetermined fourth threshold is set to, for example, 5° C., but is not limited to this example and may be set to any value.

If the absolute value of the temperature difference is greater than or equal to the fourth threshold (YES in S49), the control device 80 turns the pump 32 on high (S50) and ends the compressor control process. When the compressor 52 is off and the pump 32 is on high, the heat exchange between the second heat medium and the first heat medium can be suppressed more than when the compressor 52 is on low.

If the absolute value of the temperature difference is less than the fourth threshold (NO in S49), the control device 80 ends the compressor control process. In this case, the pump 32 is on low. When the compressor 52 is off and the pump 32 is on low, the heat exchange between the second heat medium and the first heat medium can be suppressed more than when the compressor 52 is off and the pump 32 is on high.

In the compressor control process, as described above, the level of heat exchange between the second heat medium and the first heat medium can be changed stepwise by switching the combination of the state of the compressor 52 and the state of the pump 32. The battery temperature can thus be efficiently lowered by using the first heat medium that has exchanged heat with the second heat medium.

Figure 12:
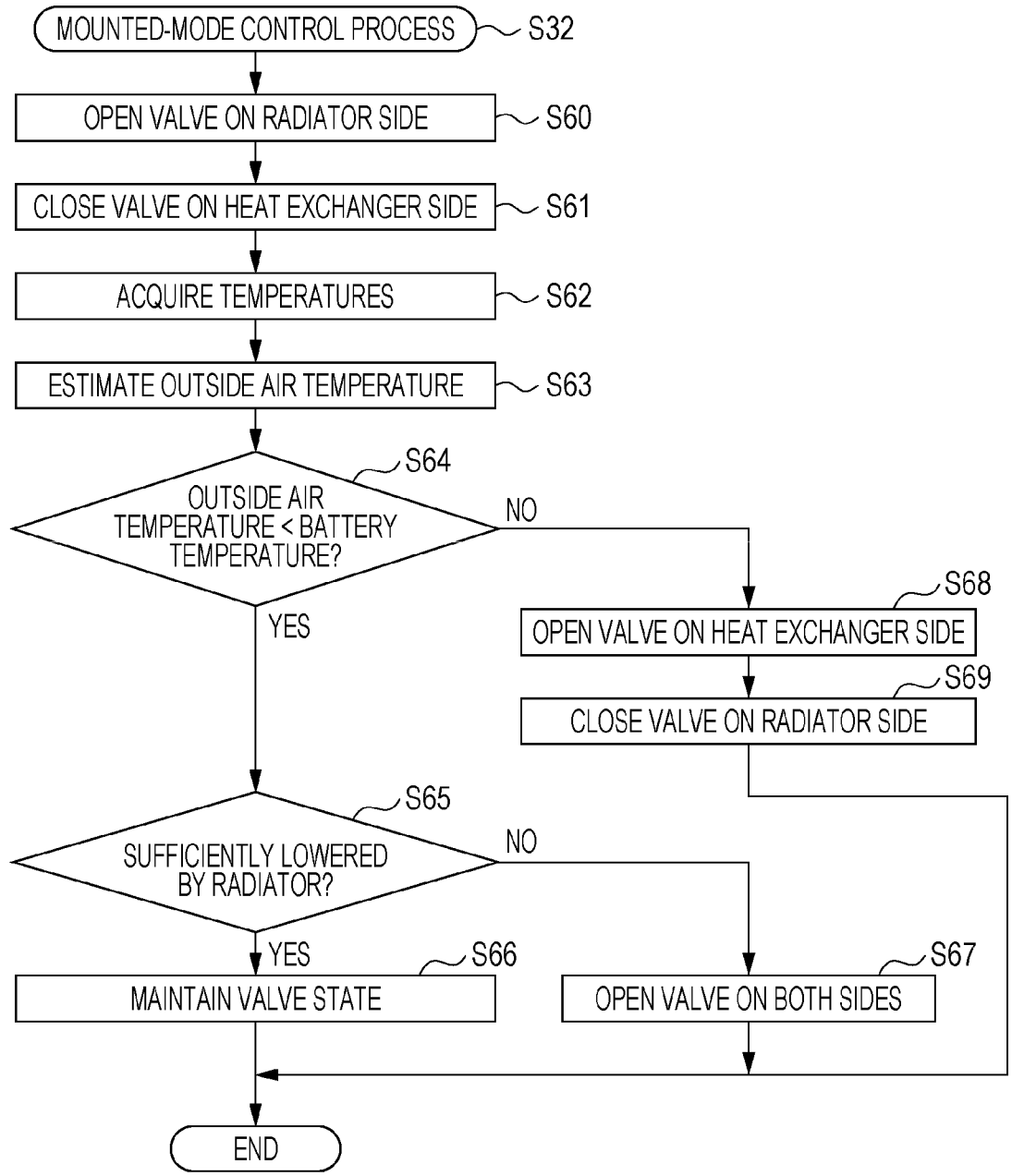
FIG. 12 is a flowchart illustrating a flow of a mounted-mode control process.

FIG. 12 is a flowchart illustrating a flow of the mounted-mode control process (S32). In the mounted-mode control process, the control device 80 basically performs control in such a way that even when a heat source is mounted, a temperature-lowering operation using the radiator 36 is given a higher priority than a temperature-lowering operation using the heat source. The control device 80 then performs control in such a way that if the battery temperature cannot be sufficiently lowered by the radiator 36, a temperature-lowering operation using the heat source is performed as well as the temperature-lowering operation using the radiator 36.

When the mounted-mode control process starts, the control device 80 opens the valve 38 on the side of the radiator 36 (S60) and closes the valve 38 on the side of the heat exchanger 24 (S61). This shuts off the flow of the first heat medium into the heat exchanger 24 and allows the first heat medium to flow into the radiator 36. Next, the control device 80 acquires the temperature of the first heat medium on the inlet side of the radiator 36 from the first temperature sensor 40 and acquires the temperature of the first heat medium on the outlet side of the radiator 36 from the second temperature sensor 42 (S62). Then, the control device 80 estimates the outside air temperature on the basis of the acquired temperatures (S63).

Next, the control device 80 determines whether the outside air temperature is lower than the battery temperature (S64). This corresponds to the determination as to whether the battery temperature can be lowered with the first heat medium that has exchanged heat with the outside air in the radiator 36.

If the outside air temperature is lower than the battery temperature (YES in S64), the battery temperature can be lowered by the radiator 36. Therefore, the control device 80 determines whether the battery temperature is sufficiently lowered by the radiator 36 (S65). For example, if the temperature detected on the inlet side of the radiator 36 by the second temperature sensor 42 falls below a predetermined value within a predetermined period of time, the control device 80 determines that the battery temperature is sufficiently lowered by the radiator 36. The method of determination in step S65 is not limited to the example described above, and any other method may be used. For example, the determination in step S65 may be made on the basis of the temperature difference between the temperature of the first heat medium on the inlet side of the radiator 36 and the temperature of the first heat medium on the outlet side of the radiator 36.

If determining that the battery temperature is sufficiently lowered by the radiator 36 (YES in S65), the control device 80 maintains the current state of the valve 38 (S66) and ends the mounted-mode control process. In this case, the valve 38 is kept open on the side of the radiator 36 and kept closed on the side of the heat exchanger 24. That is, the control device 80 lowers the battery temperature with the first heat medium that has exchanged heat in the radiator 36.

If determining that the battery temperature is not sufficiently lowered by the radiator 36 (NO in S65), the control device 80 opens the valve 38 on both the side of the radiator 36 and the side of the heat exchanger 24 (S67) and ends the mounted-mode control process. That is, the control device 80 lowers the battery temperature with both the first heat medium that has exchanged heat in the radiator 36 and the first heat medium that has exchanged heat with the heat source placed in the heat exchanger 24.

The temperature-lowering operation using both the radiator 36 and the heat source can lower the battery temperature more efficiently with less power consumption of the compressor 52 than the temperature-lowering operation using both the radiator 36 and the second heat medium. It is thus possible to reduce a decrease in the state of charge (SOC) of the onboard battery 20.

The control device 80 may determine, after opening the valve 38 on both the side of the radiator 36 and the side of the heat exchanger 24, whether the battery temperature is sufficiently lowered by the radiator 36 and the heat source. If determining that the battery temperature is not sufficiently lowered even by both the radiator 36 and the heat source, the control device 80 may drive the compressor 52 to lower the battery temperature by using the following three: the radiator 36, the heat source, and the second heat medium.

Referring back to step S64, if the outside air temperature is higher than or equal to the battery temperature (NO in S64), it is difficult to lower the battery temperature with the radiator 36. In this case, the control device 80 opens the valve 38 on the side of the heat exchanger 24 (S68), closes the valve 38 on the side of the radiator 36 (S69), and ends the mounted-mode control process. That is, the control device 80 lowers the battery temperature using the first heat medium that has exchanged heat with the heat source placed in the heat exchanger 24.

The temperature-lowering operation using the heat source can lower the battery temperature more efficiently with less power consumption of the compressor 52 than the temperature-lowering operation using the second heat medium. It is thus possible to reduce a decrease in the SOC of the onboard battery 20.

If the outside air temperature is higher than or equal to the battery temperature (NO in S64), the control device 80 may determine whether the battery temperature can be sufficiently lowered with the heat source mounted in the container 62 in the heat exchanger 24. Then if determining that the battery temperature cannot be sufficiently lowered with the heat source, the control device 80 may drive the compressor 52 to lower the battery temperature by using both the heat source and the second heat medium.

Figure 13:
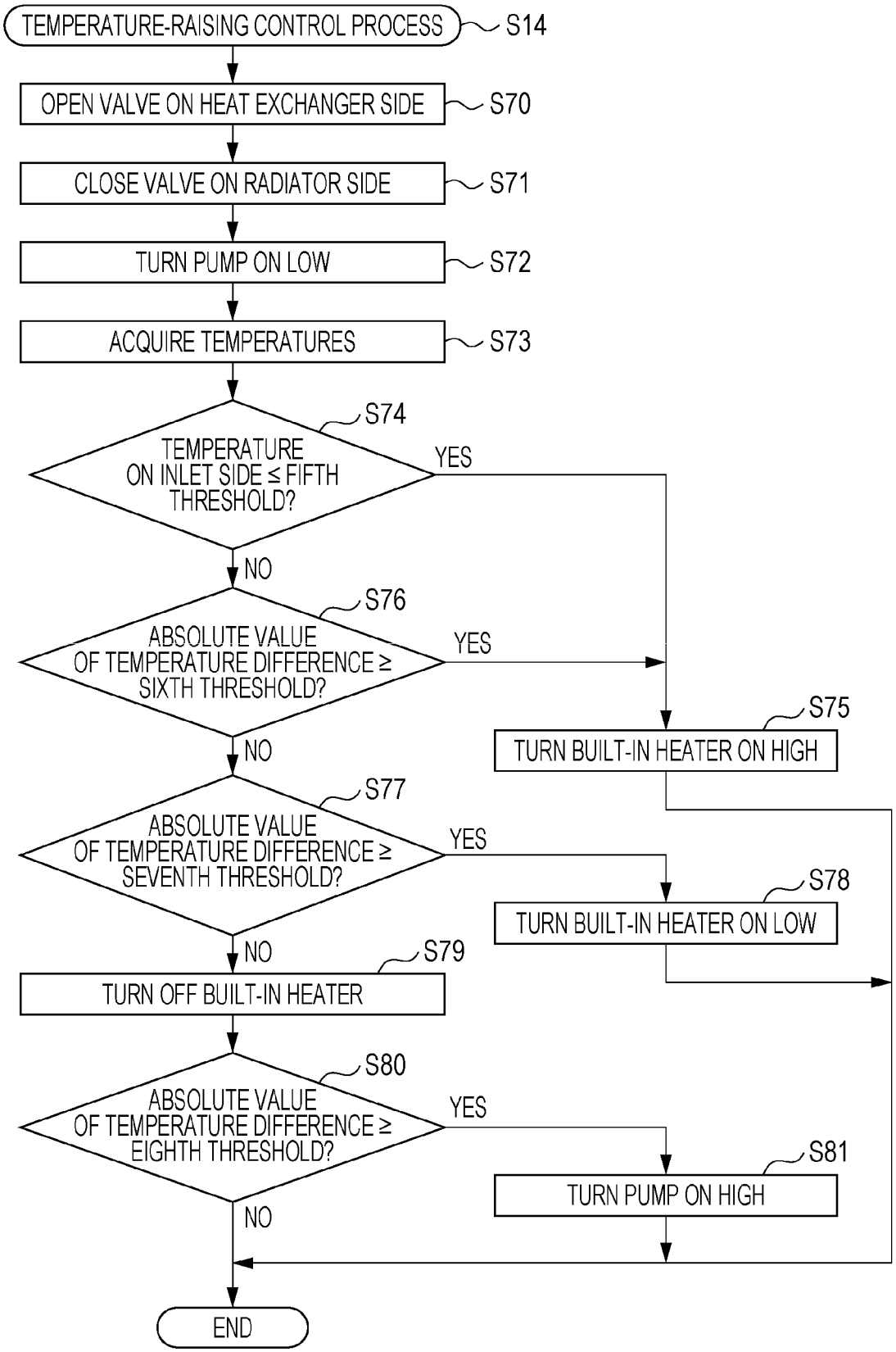
FIG. 13 is a flowchart illustrating a flow of a temperature-raising control process.

FIG. 13 is a flowchart illustrating a flow of a temperature-raising control process (S14). In the temperature-raising control process, a heat source serving as a heating energy source may be placed in the heat exchanger 24. In the temperature-raising control process, an alert may be given to prevent a heat source serving as a cooling energy source from being placed in the heat exchanger 24.

When the temperature-raising control process starts, the control device 80 opens the valve 38 on the side of the heat exchanger 24 (S70) and closes the valve 38 on the side of the radiator 36 (S71). This shuts off the flow of the first heat medium into the radiator 36 and allows the first heat medium to flow into the heat exchanger 24. Next, the control device 80 turns the pump 32 on low (S72). This allows circulation of the first heat medium. The control device 80 then acquires the temperature of the first heat medium on the inlet side of the heat exchanger 24 from the first temperature sensor 40 and acquires the temperature of the first heat medium on the outlet side of the heat exchanger 24 from the second temperature sensor 42 (S73).

Next, the control device 80 determines whether the temperature of the first heat medium detected on the inlet side of the heat exchanger 24 by the first temperature sensor 40 is lower than or equal to a predetermined fifth threshold (S74). The predetermined fifth threshold is set within the proper temperature range of the battery temperature. The predetermined fifth threshold is set to, for example, 15° C., but is not limited to this example and may be set to any value.

If the temperature on the inlet side is lower than or equal to the fifth threshold (YES in S74), the battery temperature is not sufficiently raised. Accordingly, the control device 80 turns the built-in heater 70 on high (S75) and ends the temperature-raising control process.

If the temperature on the inlet side is higher than the fifth threshold (NO in S74), the control device 80 determines whether the absolute value of the temperature difference of the first heat medium in the heat exchanger 24 is greater than or equal to a predetermined sixth threshold (S76). The temperature difference is derived by subtracting the temperature of the first heat medium detected on the inlet side of the heat exchanger 24 by the first temperature sensor 40 from the temperature of the first heat medium detected on the outlet side of the heat exchanger 24 by the second temperature sensor 42. The predetermined sixth threshold is set to, for example, 10° C., but is not limited to this example and may be set to any value.

If the absolute value of the temperature difference is greater than or equal to the sixth threshold (YES in S76), the battery temperature is not sufficiently raised. Accordingly, the control device 80 turns the built-in heater 70 on high (S75) and ends the temperature-raising control process.

If the absolute value of the temperature difference is less than the sixth threshold (NO in S76), the control device 80 determines whether the absolute value of the temperature difference is greater than or equal to a predetermined seventh threshold (S77). The predetermined seventh threshold is set to be less than the sixth threshold. The predetermined seventh threshold is set to, for example, 7° C., but is not limited to this example and may be set to any value.

If the absolute value of the temperature difference is greater than or equal to the seventh threshold (YES in S77), the control device 80 turns the built-in heater 70 on low (S78) and ends the temperature-raising control process. When the built-in heater 70 is on low, the heat exchange in the heat exchanger 24 can be suppressed more than when the built-in heater 70 is on high.

If the absolute value of the temperature difference is less than the seventh threshold (NO in S77), the control device 80 turns off the built-in heater 70 (S79). Next, the control device 80 determines whether the absolute value of the temperature difference is greater than or equal to a predetermined eighth threshold (S80). The predetermined eighth threshold is set to be less than the seventh threshold. The predetermined eighth threshold is set to, for example, 5° C., but is not limited to this example and may be set to any value.

If the absolute value of the temperature difference is greater than or equal to the eighth threshold (YES in S80), the control device 80 turns the pump 32 on high (S81) and ends the temperature-raising control process. If the built-in heater 70 is off and the pump 32 is on high, the heat exchange in the heat exchanger 24 can be suppressed more than when the built-in heater 70 is on low.

If the absolute value of the temperature difference is less than the eighth threshold (NO in S80), the control device 80 ends the temperature-raising control process. In this case, the pump 32 is on low. When the built-in heater 70 is off and the pump 32 is on low, the heat exchange in the heat exchanger 24 can be suppressed more than when the built-in heater 70 is off and the pump 32 is on high.

In the temperature-raising control process, as described above, the level of heat exchange in the heat exchanger 24 can be changed stepwise by switching the combination of the state of the built-in heater 70 and the state of the pump 32. The battery temperature can thus be efficiently lowered by using the first heat medium.

In the temperature-raising control process, when a heat source serving as a heating energy source is placed in the heat exchanger 24, the first heat medium in the heat exchanger 24 is heated both by the built-in heater 70 and the heat source. In this case, the battery temperature can be lowered to fall within the proper temperature range earlier than when no heat source is placed. This can reduce power consumption of the built-in heater 70 and the pump 32 and can reduce a decrease in the SOC of the onboard battery 20.

As described above, the battery temperature regulating apparatus 10 according to the first embodiment includes the heat exchanger 24 including the container 62 and the first internal passage 66. The container 62 is configured to accommodate a heat source that does not use a power supply for the vehicle 1, and the first internal passage 66 is disposed around the container 62 in such a way as to allow heat exchange. The heat exchanger 24 thus allows heat exchange between the heat source mounted in the container 62 and the first heat medium flowing through the first internal passage 66. The first heat medium flowing out of the heat exchanger 24 enters the temperature regulating plate 22 where it exchanges heat with the onboard battery 20. The temperature of the onboard battery 20 can thus be regulated with the heat source mounted in the container 62.

In the battery temperature regulating apparatus 10 according to the first embodiment, if determining that the temperature of the onboard battery 20 is higher than the upper threshold and a heat source is mounted in the container 62, the control device 80 controls the valve 38 in such a way as to allow the first heat medium to flow through the heat exchanger 24. The temperature of the onboard battery 20 can thus be regulated with the heat source mounted in the container 62.

The battery temperature regulating apparatus 10 according to the first embodiment can thus regulate the temperature of the onboard battery 20 while reducing the power consumption of the onboard battery 20.

The battery temperature regulating apparatus 10 according to the first embodiment is configured to allow an occupant to place a heat source, as intended, in the container 62. The battery temperature regulating apparatus 10 according to the first embodiment can thus regulate the temperature of the onboard battery 20 as intended by the occupant.

When the temperature of the onboard battery 20 is regulated to fall within the proper temperature range, the temperature of the first heat medium is kept at a predetermined temperature according to the temperature of the onboard battery 20. When the plastic bottle 72 is mounted in the container 62 in this case, the heat exchanger 24 can keep the temperature of the plastic bottle 72 in the container 62 with the first heat medium.

Referring to FIG. 10, if the outside air temperature is lower than the battery temperature in step S29, the current state of the valve 38 is maintained in step S30 and the temperature of the onboard battery 20 is regulated by the radiator 36. If the outside air temperature is lower than the battery temperature, however, the control device 80 may determine whether the battery temperature is sufficiently lowered by the radiator 36. If determining that the battery temperature is not sufficiently lowered by the radiator 36, the control device 80 may open the valve 38 on both the side of the radiator 36 and the size of the heat exchanger 24 so as to simultaneously perform the temperature-lowering operation using the radiator 36 and the compressor control process.

Figure 14:
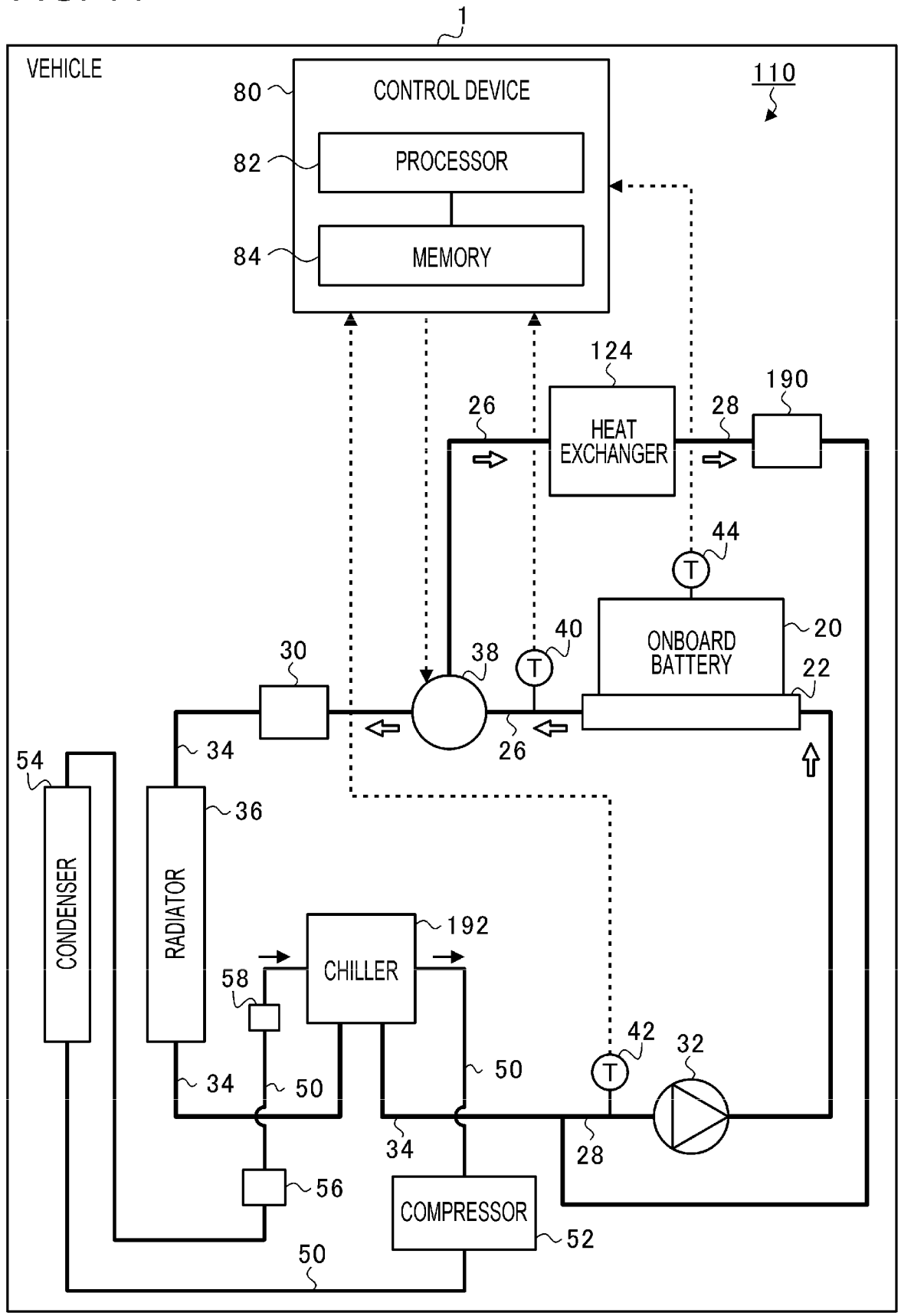
FIG. 14 is a schematic diagram illustrating a configuration of the vehicle including a battery temperature regulating apparatus according to an embodiment.

FIG. 14 is a schematic diagram illustrating a configuration of the vehicle 1 including a battery temperature regulating apparatus 110 according to a second embodiment. The battery temperature regulating apparatus 110 according to the second embodiment includes a heat exchanger 124, instead of the heat exchanger 24. The heat exchanger 124 is coupled to other components differently from the heat exchanger 24 in the battery temperature regulating apparatus 10 according to the first embodiment.

The first passage 26 in the battery temperature regulating apparatus 110 extends from the outlet of the internal pipe in the temperature regulating plate 22 and reaches the inlet of the heat exchanger 124. The second passage 28 in the battery temperature regulating apparatus 110 extends from the outlet of the heat exchanger 124 and reaches the inlet of the internal pipe in the temperature regulating plate 22.

The third passage 34 in the battery temperature regulating apparatus 110 branches off the first passage 26 and joins the second passage 28. The radiator 36 is disposed in the middle of the third passage 34. The reservoir tank 30 is disposed in the third passage 34 between the radiator 36 and the branch point at which the third passage 34 branches off the first passage 26.

The battery temperature regulating apparatus 110 includes a chamber 190 and a chiller 192. The chamber 190 is disposed in the second passage 28 between the heat exchanger 124 and the junction at which the third passage 34 joins the second passage 28. The chamber 190 is configured to temporarily store the first heat medium flowing through the second passage 28. The chiller 192 is disposed in the third passage 34 between the radiator 36 and the junction at which the third passage 34 joins the second passage 28. The fourth passage 50 in the battery temperature regulating apparatus 110 extends from the chiller 192, passes through the compressor 52 and the condenser 54, and returns to the chiller 192. With the second heat medium flowing through the fourth passage 50, the chiller 192 cools the first heat medium flowing through the third passage 34.

Figure 15:
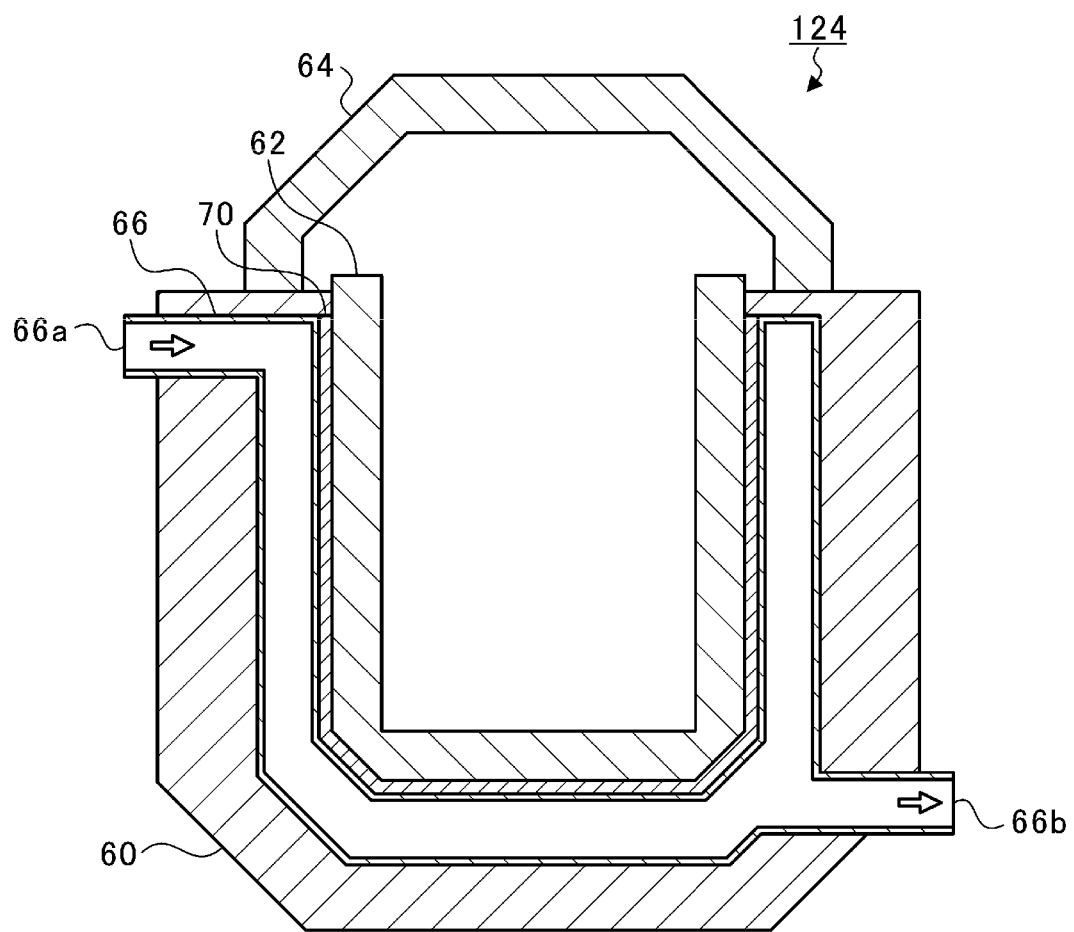
FIG. 15 is a vertical cross-sectional view illustrating a configuration of a heat exchanger according to the embodiment.

FIG. 15 is a vertical cross-sectional view illustrating a configuration of the heat exchanger 124 according to the second embodiment. The heat exchanger 124 according to the second embodiment is the same as the heat exchanger 24 according to the first embodiment, except that the heat exchanger 124 does not include the second internal passage 68. That is, when a heat source is mounted in the container 62, the heat exchanger 124 allows heat exchange between the first heat medium flowing through the first internal passage 66 and the heat source. The built-in heater 70 of the heat exchanger 124 is capable of heating the first heat medium flowing through the first internal passage 66.

Figure 16:
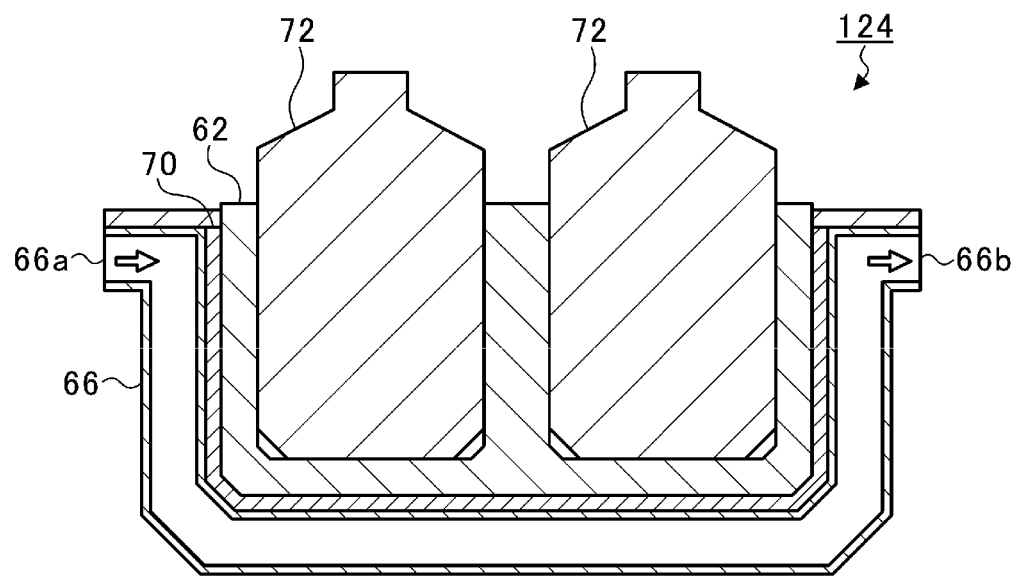
FIG. 16 is a vertical cross-sectional view illustrating a modification of the heat exchanger according to the embodiment.

FIG. 16 is a vertical cross-sectional view illustrating a modification of the heat exchanger 124 according to the second embodiment. The heat exchanger 124 illustrated in FIG. 16 is configured, for example, as a drink holder. The container 62 in the heat exchanger 124 illustrated in FIG. 16 has a plurality of internal spaces that can accommodate heat sources. The container 62 illustrated in FIG. 16 has two internal spaces each holding a plastic bottle 72. The cover 64 for the heat exchanger 124 is optional.

Figure 17:
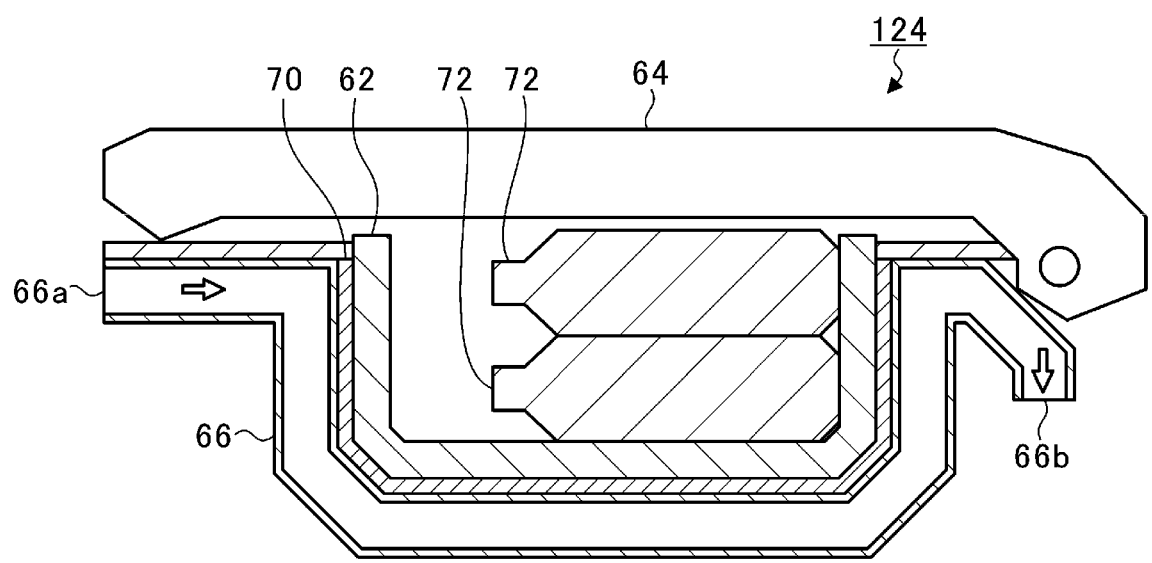
FIG. 17 is a vertical cross-sectional view illustrating another modification of the heat exchanger according to the embodiment.

FIG. 17 is a vertical cross-sectional view illustrating another modification of the heat exchanger 124 according to the second embodiment. The heat exchanger 124 illustrated in FIG. 17 is configured, for example, as a console box. The container 62 in the heat exchanger 124 illustrated in FIG. 17 has a substantially rectangular box shape. The container 62 has an internal space large enough to accommodate a plurality of heat sources. The container 62 illustrated in FIG. 17 has one internal space holding two plastic bottles 72.

As in the first embodiment, the battery temperature regulating apparatus 110 according to the second embodiment includes the heat exchanger 124 including the container 62 configured to accommodate a heat source that does not use a power supply for the vehicle 1, and the first internal passage 66. The heat exchanger 124 allows heat exchange between the heat source mounted in the container 62 and the first heat medium flowing through the first internal passage 66. The first heat medium flowing out of the heat exchanger 124 enters the temperature regulating plate 22 where it exchanges heat with the onboard battery 20.

Accordingly, as in the first embodiment, the battery temperature regulating apparatus 110 according to the second embodiment can regulate the temperature of the onboard battery 20 while reducing the power consumption of the onboard battery 20.

Although the embodiments of the disclosure have been described with reference to the accompanying drawings, the disclosure is not limited to the embodiments described above. A person skilled in the art can make various changes or modifications within the scope of the appended claims. It is to be understood that those changes or modifications are also within the technical scope of the disclosure.

For example, the built-in heater 70 in the heat exchangers 24 and 124 is optional. If the built-in heater 70 is not provided, the container 62 is in contact with the first internal passage 66. The features of the embodiments and their modifications may be appropriately combined.

The control device 80 illustrated in FIG. 1 and FIG. 14 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1 and FIG. 14.

The invention claimed is:

1. A battery temperature regulating apparatus to be applied to a vehicle, the battery temperature regulating apparatus comprising:
   an onboard battery;
   a temperature regulating plate configured to allow heat exchange between the onboard battery and a first heat medium flowing into the temperature regulating plate;
   a heat exchanger;
   a first passage configured to guide the first heat medium flowing out of the temperature regulating plate to the heat exchanger;
   a second passage configured to guide the first heat medium flowing out of the heat exchanger to the temperature regulating plate;
   a third passage configured to branch off the first passage at a branch point and join the second passage;
   a radiator disposed in the third passage;
   a valve capable of opening and closing the first passage on a side of the branch point closer to the heat exchanger and capable of opening and closing the third passage on another side of the branch point;
   a first temperature sensor configured to detect a temperature of the first heat medium flowing through the first passage; and
   a control device,
   wherein the heat exchanger comprises
   a container configured to accommodate a heat source that does not use a power supply for the vehicle, and
   a first internal passage disposed around the container in such a way as to allow heat exchange, the first internal passage being configured to allow the first passage to communicate with the second passage;
   the control device comprises
   at least one memory, and
   at least one processor coupled to the at least one memory and configured to execute a process in cooperation with a program included in the at least one memory; and
   the process comprises
   determining whether a temperature of the onboard battery is higher than an upper threshold of a proper temperature range,
   determining whether the heat source is mounted in the container at least on a basis of the temperature of the first heat medium detected by the first temperature sensor, and
   in a case where the temperature of the onboard battery is determined to be higher than the upper threshold and that the heat source is mounted in the container, controlling the valve in such a way as to allow the first heat medium to flow through the heat exchanger.

2. The battery temperature regulating apparatus according to claim 1, further comprising a second temperature sensor configured to detect a temperature of the first heat medium flowing through the second passage,
   wherein the process further comprises determining that the heat source is mounted in the container in a case where an absolute value of a temperature difference is greater than or equal to a predetermined value, the temperature difference being obtained by subtracting the temperature detected by the first temperature sensor from the temperature detected by the second temperature sensor.

3. The battery temperature regulating apparatus according to claim 2, wherein in a case where the temperature of the onboard battery is determined to be higher than the upper threshold, the heat source is determined to be mounted in the container, the process further comprises, in a case where an outside air temperature is higher than or equal to the temperature of the onboard battery, controlling the valve in such a way as to prohibit the first heat medium from flowing into the radiator and allow the first heat medium to flow through the heat exchanger.

4. The battery temperature regulating apparatus according to any one of claim 3, wherein, in the case where the temperature of the onboard battery is determined to be higher than the upper threshold and the heat source is determined to be mounted in the container, the process further comprises
- in a case where the outside air temperature is lower than the temperature of the onboard battery, determining whether the temperature of the onboard battery is sufficiently lowered by the radiator, and
- in a case where the temperature of the onboard battery is determined not to be sufficiently lowered by the radiator, controlling the valve in such a way as to allow the first heat medium to flow through both the radiator and the heat exchanger.

5. The battery temperature regulating apparatus according to any one of claim 2, wherein, in a case where the temperature of the onboard battery is determined to be higher than the upper threshold and the heat source is determined to be mounted in the container, the process further comprises
- in a case where an outside air temperature is lower than the temperature of the onboard battery, determining whether the temperature of the onboard battery is sufficiently lowered by the radiator, and
- in a case where the temperature of the onboard battery is determined not to be sufficiently lowered by the radiator, controlling the valve in such a way as to allow the first heat medium to flow through both the radiator and the heat exchanger.

6. The battery temperature regulating apparatus according to claim 1, wherein in a case where the temperature of the onboard battery is determined to be higher than the upper threshold, the heat source is determined to be mounted in the container, the process further comprises, in a case where an outside air temperature is higher than or equal to the temperature of the onboard battery, controlling the valve in such a way as to prohibit the first heat medium from flowing into the radiator and allow the first heat medium to flow through the heat exchanger.

7. The battery temperature regulating apparatus according to any one of claim 6, wherein, in the case where the temperature of the onboard battery is determined to be higher than the upper threshold and the heat source is determined to be mounted in the container, the process further comprises
- in a case where the outside air temperature is lower than the temperature of the onboard battery, determining whether the temperature of the onboard battery is sufficiently lowered by the radiator, and
- in a case where the temperature of the onboard battery is determined not to be sufficiently lowered by the radiator, controlling the valve in such a way as to allow the first heat medium to flow through both the radiator and the heat exchanger.

* * * * *